(12) United States Patent
Ozaki et al.

(10) Patent No.: US 9,712,404 B2
(45) Date of Patent: Jul. 18, 2017

(54) PERFORMANCE EVALUATION METHOD AND INFORMATION PROCESSING DEVICE

(71) Applicant: HITACHI, LTD., Tokyo (JP)

(72) Inventors: Nobuaki Ozaki, Tokyo (JP); Daisuke Iizuka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 48 days.

(21) Appl. No.: 14/896,114

(22) PCT Filed: Mar. 7, 2014

(86) PCT No.: PCT/JP2014/055898
§ 371 (c)(1),
(2) Date: Dec. 4, 2015

(87) PCT Pub. No.: WO2015/132945
PCT Pub. Date: Sep. 11, 2015

(65) Prior Publication Data
US 2016/0127204 A1    May 5, 2016

(51) Int. Cl.
| | |
|---|---|
| *G06F 9/455* | (2006.01) |
| *H04L 12/26* | (2006.01) |
| *G06F 9/50* | (2006.01) |
| *G06F 11/34* | (2006.01) |
| *H04L 29/08* | (2006.01) |
| *H04L 12/24* | (2006.01) |

(52) U.S. Cl.
CPC .............. *H04L 43/04* (2013.01); *G06F 9/505* (2013.01); *G06F 11/3433* (2013.01); *H04L 41/147* (2013.01); *H04L 43/06* (2013.01); *H04L 43/0817* (2013.01); *H04L 67/10* (2013.01); *G06F 2201/81* (2013.01); *G06F 2201/815* (2013.01); *G06F 2209/508* (2013.01)

(58) Field of Classification Search
None
See application file for complete search history.

(56) References Cited

U.S. PATENT DOCUMENTS

| 7,653,725 B2 * | 1/2010 | Yahiro ................ G06F 11/3485 709/223 |
| 8,209,684 B2 * | 6/2012 | Kannan ............... G06F 9/45533 717/127 |
| 9,495,195 B2 * | 11/2016 | Terayama ............. G06F 9/5011 |

(Continued)

FOREIGN PATENT DOCUMENTS

JP     2012-146015 A     8/2012

*Primary Examiner* — Emerson Puente
*Assistant Examiner* — Mehran Kamran
(74) *Attorney, Agent, or Firm* — Volpe and Koenig, P.C.

(57) ABSTRACT

In performance estimation when the configuration of a computer system is changed, the influence, on performance, of a temporary increase in load to a computer system due to reallocation of a process request allocated to a degenerated server to another server as a result of server degeneration is taken into consideration. In an embodiment, an information processing device which evaluates the performance of the computer system estimates the performance of the computer system when operation of a server included in the computer system is stopped based on the throughput required for the server at the time of operation stop and outputs the estimated performance of the computer system.

5 Claims, 20 Drawing Sheets

(56) References Cited

U.S. PATENT DOCUMENTS

| | | | |
|---|---|---|---|
| 2004/0193827 A1* | 9/2004 | Mogi | G06F 9/5083 711/170 |
| 2006/0037018 A1* | 2/2006 | Fang | H04L 43/0888 718/100 |
| 2006/0242356 A1* | 10/2006 | Mogi | G06F 9/5083 711/100 |
| 2007/0250629 A1* | 10/2007 | Blanding | G06F 9/505 709/226 |
| 2008/0104248 A1* | 5/2008 | Yahiro | G06F 11/3495 709/226 |
| 2009/0172666 A1* | 7/2009 | Yahalom | G06F 3/0605 718/1 |
| 2009/0241095 A1* | 9/2009 | Jones | G06F 11/3419 717/128 |
| 2010/0268816 A1* | 10/2010 | Tarui | H04L 12/00 709/224 |
| 2012/0030346 A1* | 2/2012 | Fukuda | G06F 11/0709 709/224 |
| 2012/0117226 A1* | 5/2012 | Tanaka | H04L 41/0266 709/224 |
| 2012/0209568 A1* | 8/2012 | Arndt | G06F 11/3089 702/183 |
| 2014/0143418 A1* | 5/2014 | Nakajima | G06F 11/3034 709/224 |
| 2014/0215077 A1* | 7/2014 | Soudan | H04L 47/11 709/226 |
| 2015/0222516 A1* | 8/2015 | Deval | H04L 67/1029 370/253 |
| 2015/0277767 A1* | 10/2015 | Hamano | G06F 3/0665 711/114 |
| 2015/0350019 A1* | 12/2015 | Terayama | H04L 41/0816 709/221 |
| 2016/0224392 A1* | 8/2016 | Clarke | G06F 9/5083 |

* cited by examiner

| HOST NAME | CONNECTION DESTINATION | HOST TYPE |
|---|---|---|
| Machine_0 | SW_0 | Server_A |
| Machine_1 | SW_0 | Server_A |
| Machine_2 | SW_0 | Server_B |
| SW_0 | Router_0 | SW |
| Router_0 | Input | Router |
| Storage_0 | Machine_0、Machine_1、Machine_2 | Storage_A |

| VIRTUAL HOST NAME | ARRANGEMENT | HOST TYPE |
|---|---|---|
| Virtual Machine_0 | Machine_0 | VM_A |
| Virtual Machine_1 | Machine_0 | VM_A |
| Virtual Machine_2 | Machine_1 | VM_B |
| Virtual SW_0 | SW_0 | VSW_A |
| Virtual Router_0 | Router_0 | VR_A |

501　502　503

600

| HOST TYPE | PERFORMANCE |
|---|---|
| Server_A | 4.0 |
| Server_B | 1.0 |
| SW | 8.0 |
| Router | 8.0 |
| VM_A | 1.0 |
| VM_B | 2.0 |
| VSW_A | 4.0 |
| VR_A | 4.0 |
| Storage_A | 10.0 |

601 = HOST TYPE column, 602 = PERFORMANCE column

| HOST NAME | CONNECTION DESTINATION | HOST TYPE |
|---|---|---|
| Virtual Machine_0 | Virtual SW_0 | WEB SERVER |
| Virtual Machine_1 | Virtual SW_0 | WEB SERVER |
| Virtual Machine_2 | Virtual SW_0 | WEB SERVER |
| Virtual SW_0 | Virtual Router_0 | Load Balancer |
| Virtual Router_0 | Input | Firewall |

| SCHEDULE ID | TASK ID | OPERATION TARGET | SCHEDULED EXECUTION DATE AND TIME |
|---|---|---|---|
| S01 | T04 | Storage_0 | 07:00:00, OCTOBER 30, 2013 |
| S02 | T02 | Virtual_Machine_2 | 08:30:00, OCTOBER 30, 2013 |
| ... | ... | ... | ... |

| TASK ID | PROCESS CONTENT | REQUIRED EXECUTION TIME | OPERATION LOAD | HOST TYPE |
|---|---|---|---|---|
| T01 | VM DEPLOY | 5 (min) | 0.1 | VM_A |
| T02 | VM DEPLOY | 5 (min) | 0.1 | VM_B |
| T03 | FULL DUMP | 60 (min) | 0.4 | Storage_A |
| T04 | FULL DUMP | 120 (min) | 0.2 | Storage_A |
| T05 | VM DEGENERATION | 5 (min) | 0.1 | VM_B |
| ... | ... | ... | ... | ... |

| CONFIGURATION ID | CONFIGURATION CONTENT | EXPECTED PERFORMANCE |
|---|---|---|
| C01 | VR_A, VSW_A, VM_A, VM_A | 2.0 |
| C02 | VR_A, VSW_A, VM_A, VM_B | 3.0 |
| C03 | VR_A, VSW_A, VM_A, VM_A, VM_A | 3.0 |
| C04 | VR_A, VSW_A, VM_A, VM_A, VM_B | 4.0 |
| ... | ... | ... |

| | LOAD | 1.6 | 1.7 | 2.4 | 2.5 | ... |
|---|---|---|---|---|---|---|
| 1201 | | | | | | |
| | PERFORMANCE DETERIORATION DEGREE | C01 | 0.8 | 0.85 | 1.8 | 1.9 | ... |
| | | C02 | 0.7 | 0.75 | 1.0 | 1.05 | ... |
| 1202 | | C03 | 0.7 | 0.75 | 1.0 | 1.05 | ... |
| | | C04 | 0.5 | 0.55 | 0.9 | 1.0 | ... |
| | | ... | ... | ... | ... | ... | ... |

| | | | 1.6 | 2.4 | ... |
|---|---|---|---|---|---|
| 1301 — LOAD | | | | | |
| 1302 — PROCESS LOAD | C04 | VM_A | 0.4 | 0.6 | ... |
| | | VM_B | 0.8 | 1.2 | ... |
| | | VSW_A | 1.6 | 2.4 | ... |
| | | VR_A | 1.6 | 2.4 | ... |
| 1303 — | C01 | VM_A | 0.8 | 1.0 | ... |
| | | VSW_A | 1.6 | 2.0 | ... |
| | | VR_A | 1.6 | 2.0 | ... |
| | ... | ... | ... | ... | ... |

| LOAD | | 0.2 | 0.4 | 0.6 | 0.8 | 1.0 | 1.2 | 1.4 | 1.6 | 1.8 | 2.0 |
|---|---|---|---|---|---|---|---|---|---|---|---|
| 1401 → | VM_A | 0.1 | 0.2 | 0.3 | 0.4 | 0.5 | 0.6 | 0.7 | 0.8 | 0.9 | 1.0 |
| 1402 → QUEUE USAGE QUANTITY | VR_A | 0.2 | 0.4 | 0.6 | 0.8 | 1.0 | 1.2 | 1.4 | 1.6 | 1.8 | 2.0 |
| | ... | ... | ... | ... | ... | ... | ... | ... | ... | ... | |

| DATE AND TIME | 07:59:50, OCTOBER 30, 2013 | 07:59:55, OCTOBER 30, 2013 | 08:00:00, OCTOBER 30, 2013 | 08:00:05, OCTOBER 30, 2013 | 08:00:10, OCTOBER 30, 2013 | 08:00:15, OCTOBER 30, 2013 |
|---|---|---|---|---|---|---|
| LOAD | 1.3 | 1.3 | 1.3 | 1.3 | 1.25 | 1.3 |

1701 (DATE AND TIME)
1702 (LOAD)

| POLICY ID 1801 | AUTOMATIC EXECUTION CONTENT 1802 | TASK ID 1803 | CONDITION 1804 | CONDITION 1805 | CONDITION 1806 |
|---|---|---|---|---|---|
| P01 | AUTOMATIC VM ALLOCATION | T01 | LOAD DURING PROCESS OF WEB SERVER OF HOST TYPE VM_A IS EQUAL TO OR GREATER THAN 0.9 | NUMBER OF WEB SERVERS IS LESS THAN 6 | Machine_0 TO Machine_2 HAVE FREE CAPACITY FOR ONE VM |
| P02 | AUTOMATIC VM RECOVERY | T05 | LOAD DURING PROCESS OF WEB SERVER OF HOST TYPE VM_B IS LESS THAN 0.1 | NUMBER OF WEB SERVERS IS EQUAL TO OR GREATER THAN 3 | ... |

PERFORMANCE EVALUATION METHOD AND INFORMATION PROCESSING DEVICE

TECHNICAL FIELD

The present invention relates to a performance prediction technique for a computer system.

BACKGROUND ART

At the time of designing a computer system or at the time of executing a configuration change of the computer system, it is necessary to evaluate or verify whether or not the design or the configuration after change satisfies a performance target required by a system user. For example, PTL 1 describes a performance evaluation method which generates a performance evaluation model in consideration of an overhead according to the use of a virtualization technique for a virtualized computer system and performs evaluation of the performance of the computer system.

CITATION LIST

Patent Literature

PTL 1: JP-A-2012-146015

SUMMARY OF INVENTION

Technical Problem

According to PTL 1, it is possible to evaluate the performance of the computer system based on a system configuration and a load to the system at a certain time. However, when the configuration of the system is changed in a state where the computer system is operating, a case where reallocation of a process request allocated to a server degenerated (operation stop) by a configuration change at the time of the configuration change and not processed as a result of server degeneration to another server causes a temporary increase in load to a component of the system is taken into consideration. Accordingly, in order to increase evaluation accuracy, it is necessary to take into consideration the influence of a temporary increase in load to the system according to the configuration change on the performance of the system. In this way, there is room for improvement in the performance evaluation method of the related art in that retransmission of a process request at the time of the configuration change is not taken into consideration.

Solution to Problem

In order to solve the above-described problems, an aspect of an information processing device according to the invention estimates the performance of a computer system when operation of a server included in the computer system is stopped based on the throughput required for the server at the time of the operation stop, and outputs the estimated performance of the computer system.

Advantageous Effects of Invention

As an effect of the invention, a temporary increase in load according to a configuration change of a system is taken into consideration, whereby it is possible to increase evaluation accuracy for the performance of the computer system.

BRIEF DESCRIPTION OF DRAWINGS

FIG. 4 shows physical system configuration information of Example 1.
FIG. 5 shows virtual system configuration information of Example 1.
FIG. 8 shows tenant configuration information of Example 1.
FIG. 9 shows task schedule information of Example 1.
FIG. 10 shows task management information of Example 1.
FIG. 11 shows expected system performance information of Example 1.
FIG. 12 shows system performance deterioration degree information of Example 1.
FIG. 13 shows processing load information of Example 1.
FIG. 14 shows load-queue usage quantity correspondence information of Example 2.
FIG. 17 shows load trend information of Example 1.
FIG. 18 shows operation policy information of Example 1.

DESCRIPTION OF EMBODIMENTS

Hereinafter, a device which executes an operation in each example may be constructed especially for a required purpose or may include one or more general-purpose computers which are activated or reset selectively by one or more computer programs. Such computer programs are stored in, but not limited to, computer-readable storage mediums, such as an optical disc, a magnetic disk, a read only memory, a random access memory, a solid-state device (SSD), and a drive, or other arbitrary mediums suitable for storing electronic information.

<Outline of Example>

Figure 1:
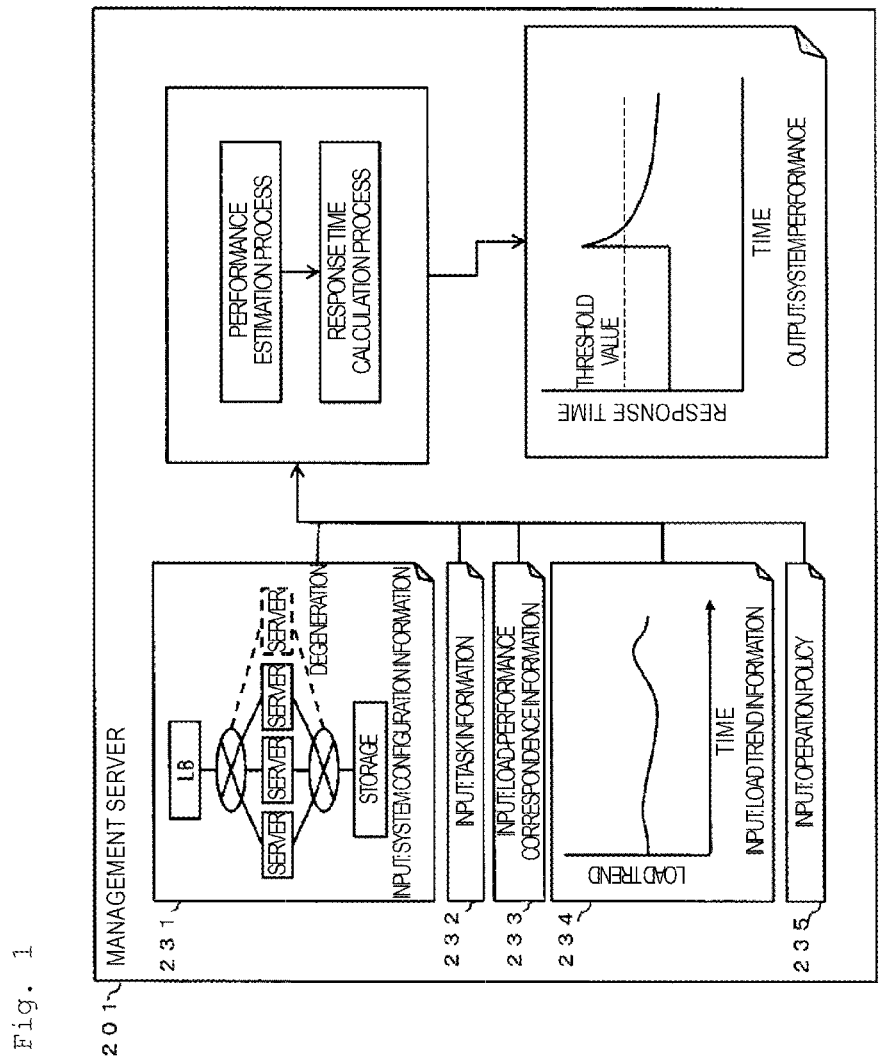
FIG. 1 is a conceptual diagram of an example.

FIG. 1 is a schematic view showing an example.

As described below, a storage device 213 provided in a management server 201 stores system configuration information 231 indicating a system configuration of a computer system to be managed, task information 232 indicating information of a process task executed in a device to be managed, load-performance correspondence information 233 storing the degree of deterioration of performance according to a load of the entire system for each combination of the amounts or types of device groups constituting a tenant of the computer system, load trend information 234 indicating the trend of a load according to a process required for the system, and operation policy information 235 of the computer system. The system configuration information 231 stores information, such as a load distribution situation of node servers according a load balancer, in addition to component information of the device to be managed.

The management server 201 performs a performance estimation process of the system assuming that a configuration change of the computer system is performed at a certain time. A performance estimation processing unit 221 calculates expected performance expected as peak performance of the computer system at an estimation target time based on the system configuration information 231. A performance deterioration degree indicating the width of a variation in a performance value (performance degradation amount) exhibitable by the computer system under a load assumed at this time based on the load trend information 234 or the task information 232. In addition, for example, when the assumed configuration change is rapid server degeneration or the like, the performance deterioration degree of the computer system due to a temporary increase in load applied to a component of the system due to reallocation of a process request to another server when the process request to the degenerated server is not processed is calculated. A response time calculation processing unit 222 calculates a system response time based on the calculated performance deterioration degree and outputs a result of comparison with a threshold value.

In recent years, service level management (SLM) is required for operation management of a computer system. In the SLM, a target value (service level objective (SLO)) of a response time or band of an IT system is determined between an IT system provider and a user, the determination is called service level agreement (SLA). Even if a configuration change of the system occurs due to a cause, such as server failure, it is important to evaluate whether or not the computer system has a configuration simply compatible with SLA in advance for service operation. At the time of a configuration change of the IT system, and in particular, when system degeneration is performed, there is a request to confirm whether or not the system is compatible with SLA due to the configuration change.

In this example, it is possible to estimate the performance of the computer system with excellent accuracy, in particular, when a configuration change occurs. In addition to a simulation when failure occurs, for example, like a cloud data center or the like, even in an environment where a system configuration is dynamically changed without following a detailed operation schedule, the transition of the performance is simulated before executing a configuration change, such as VM degeneration or volume deploy and is compared with SLO, whereby an operation manager of the computer system can evaluate a possibility of being incompatible with SLA according to a configuration change in advance.

For example, according to the state of the system, when an operation policy for executing a configuration change, such as autoscale of the system configuration, is set, a change in performance before the configuration change is executed by autoscale is simulated, a possibility of being incompatible with SLA is evaluated, thereby providing a computer system having higher availability capable of determining validity of configuration change execution by autoscale.

In particular, in a cloud service, a cloud vendor can easily determine availability of the computer system; therefore, it is possible to reduce a burden of a manager. Meanwhile, it is considered that a user of the cloud service can use the cloud system with high reliability.

EXAMPLE 1

Hereinafter, Example 1 will be described referring to the drawings.

Figure 2A:
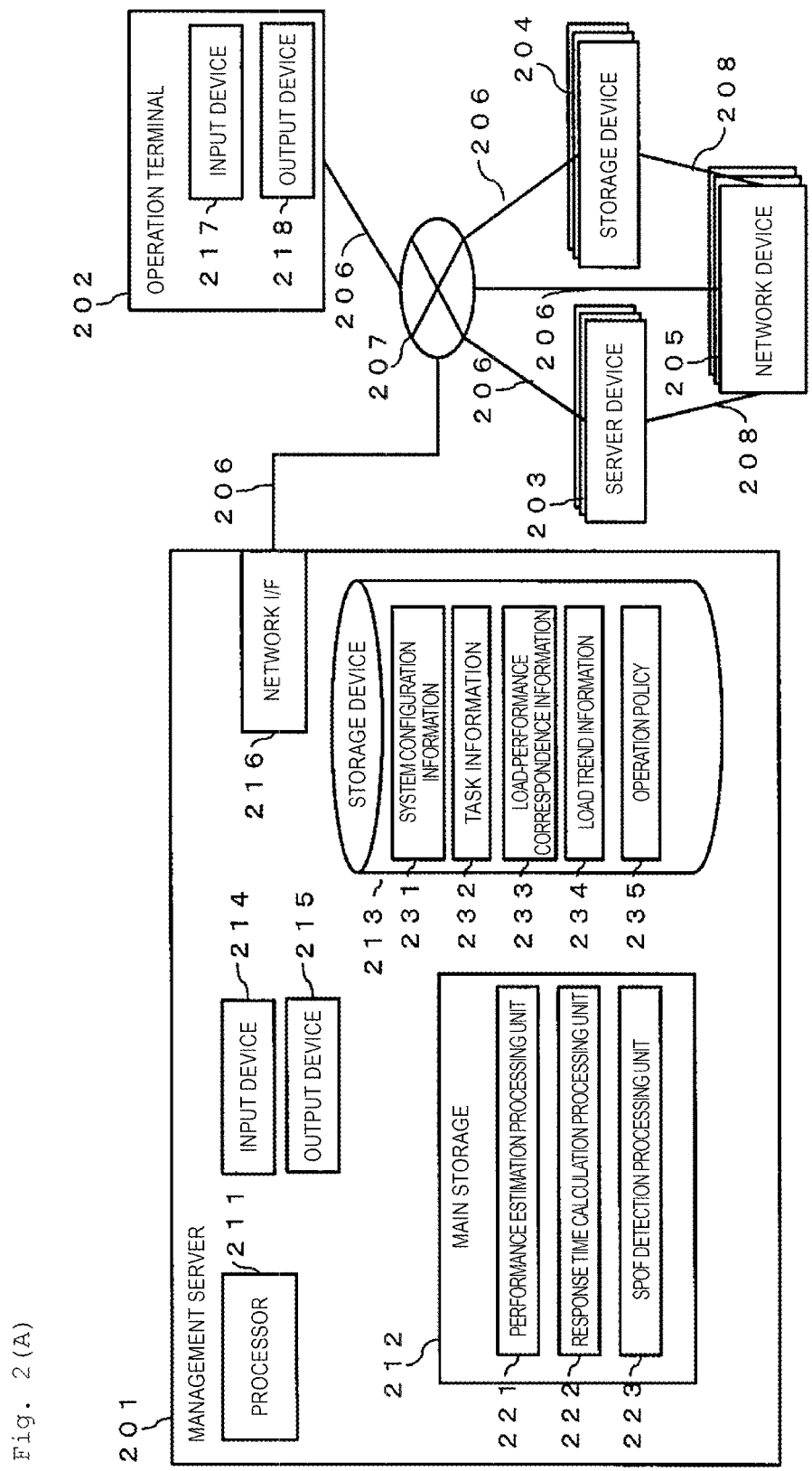
FIG. 2(A) is a system configuration diagram of Example 1.
Figure 2:
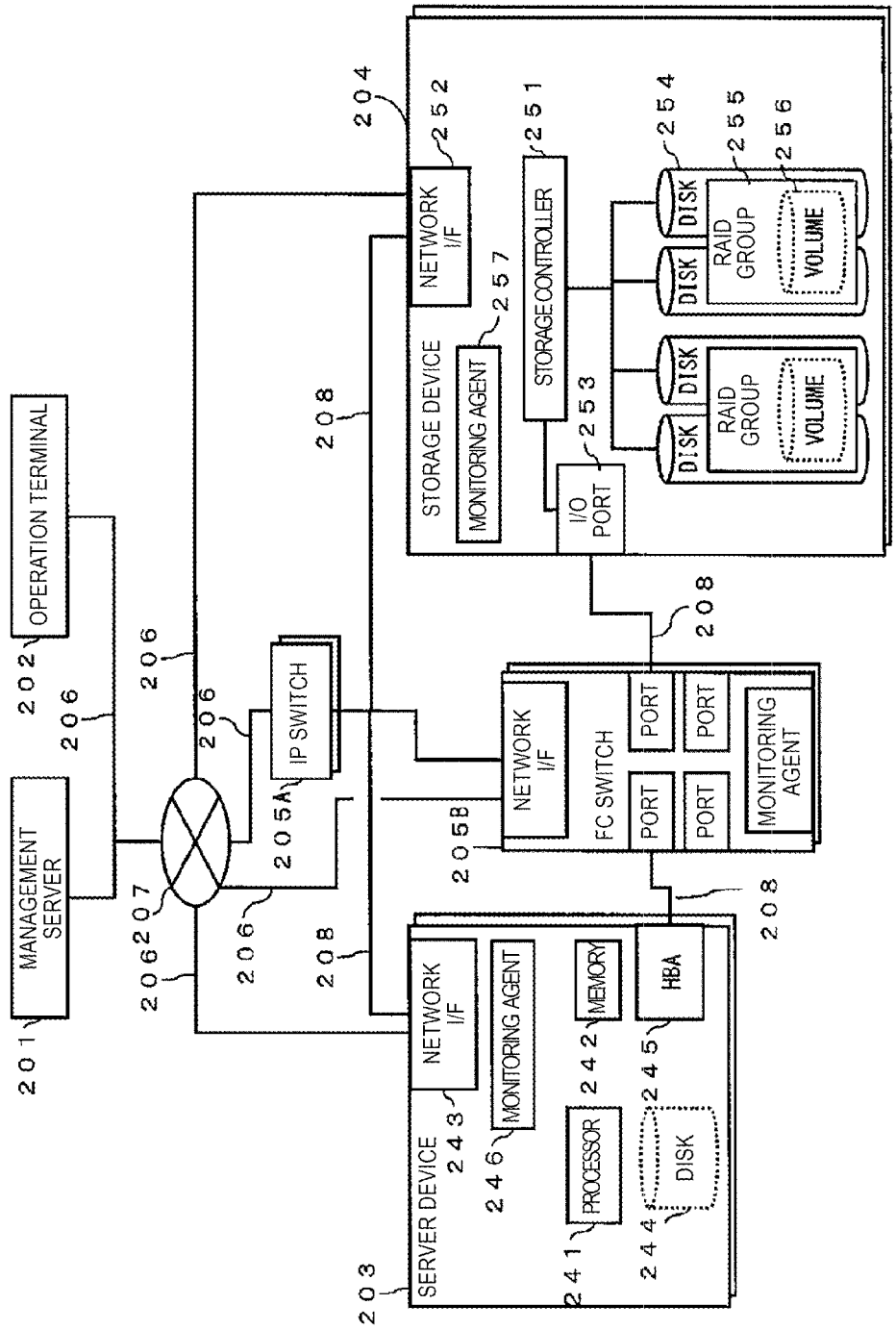
FIG. 2(B) is a system configuration diagram of Example 1.

FIGS. 2(A) and 2(B) are diagrams a system configuration of this example.

The management server 201, an operation terminal 202, server devices 203, storage devices 204, and network devices 205 are connected to a management network 207 through a link 206. The server devices 203 and the storage devices 204 are connected to the network devices 205 through links 208. The links 206 or 208 use a wired or wireless connection system, and may include one or more subnetworks or VPNs (virtual private networks). The management server 201, the operation terminal 202, the server devices 203, the storage devices 204, and the network devices 205 may be connected to the management network 207 or to the network devices 205 by different systems. The server devices 203 and the storage devices 204 may be connected directly by a wired or wireless connection system without passing through the network devices 205. The management server 201 may not necessarily be connected to the server devices 203 or the storage devices 204 for a purpose of a process of this example, or may have a configuration in which each kind of information for a process may be acquired and stored.

The number of respective devices provided in the computer system may not be as illustrated in FIG. 2(A). Two or more of the management server 201, the operation terminal 202, the server devices 203, the storage devices 204, and the network device 205 may be the same housing or the same virtual machine. The network devices 205 may be connected to other network devices 205 by a wired or wireless connection system. A network provided by the network devices 205 may be the same as the management network 207. The links 206 and the links 208 may be the same, or a wireless connection system and a wired connection system may be mixed in the links 206 or the links 208.

As shown in FIG. 2(B), the network devices 205 may be constituted of a plurality of types of network devices like an IP switch 205A and an FC switch 205B, or the links 208 may be constituted of a plurality of networks, for example, like the Ethernet (Registered Trademark) and a SAN. The operation terminal 202 may be a general-purpose computer including a processor (not shown), a memory, a main storage, and an input device 217, and an output device 218. The input device 217 and the output device 218 may be the same device, for example, like a tablet terminal.

The management server 201 includes a processor 211, a main storage 212, a storage device 213, an input device 214, an output device 215, and a network interface (I/F) 216, and are connected so as to be communicable with one another. The processor 211 executes a performance estimation processing unit 221, a response time calculation processing unit 222, and a SPOF (Single Point of Failure) detection unit 223 stored in the main storage 212, thereby performing each process of this example. Each process unit may be realized by hardware, such as an integrated circuit which performs each process, instead of being executed by the processor 211. Hereinafter, for simplification of description, a process which is realized by the processor 211 executing a program in the main storage 212 will be described with each processing unit as a processing entity.

The system configuration information 231, the task information 232, the load-performance correspondence information 233, the load trend information 234, and the operation policy information 235 stored in the storage device 213 may be stored in different storage mediums or the like such that a part thereof is stored in the storage device 213 of the management server 201 and the other part is stored in a DISK 254 of the storage device 204. Each kind of information may be manually input by the manager of the computer system using a terminal device, or may be generated or stored by any tool or utility. The storage device 213 may include an external device I/F of the management server 201 or a device for connection through a network I/F. The main storage 212 and the storage device 213 may be the same device. The input device 214 and the output device 215 may be the same device, or one or both thereof may not be provided.

Each of the server device 203 may be a general-purpose computer including a processor 241, a memory 242, a network I/F 243, and a main storage 244. Each of the server devices 203 is a device to be managed of the management server 201, and executes applications or the like. A monitoring agent 246 monitors the state of the server device 203, and acquires, for example, information of the utilization rate of the processor 241, the memory 242, the network I/F 243, the disk 244, and an HBA 245, the number of process requests per unit time, and the like.

In a representative example shown in FIG. 2(B), each of the server device 203 has an HBA (Host Bus Adapter) 245. For example, the server device 203 can virtually use the disk 244 like a local disk. The disk 244 is provided by the HBA 245 and the storage area of the storage device 204.

Each of the storage devices 204 is a device to be managed of the management server 201, and provides a storage capacity which is used by an application operating on the server device 203. Each of the storage devices 204 includes a storage controller 251, a network I/F 252 for connection to a LAN through, for example, the Ethernet, an I/O port 253 for connection to the SAN through, for example, a fiber channel or the like, and a RAID group 255 constituted of a plurality of DISKs 254, and these devices are connected so as to be communicable with one another. The DISKs 254 may be other types of storage mediums, such as an SSD and an optical storage medium. The RAID group may logically constitute a plurality of volumes 256. A monitoring agent 257 monitors the state of the storage device 204, and acquires performance information of the device to be managed, such as the utilization rate of the processor 241, the memory 242, the network I/F 243, the disk 244, and the HBA 245, and the number of process requests per unit time. The IP switch 205A may be a device to be managed for constituting a LAN or other purposes. The FC switch 205B may be a device to be managed for constituting a SAN or other purposes.

Each of the network devices 205A and 205B may include the same monitoring agent as other devices.

Figure 3:
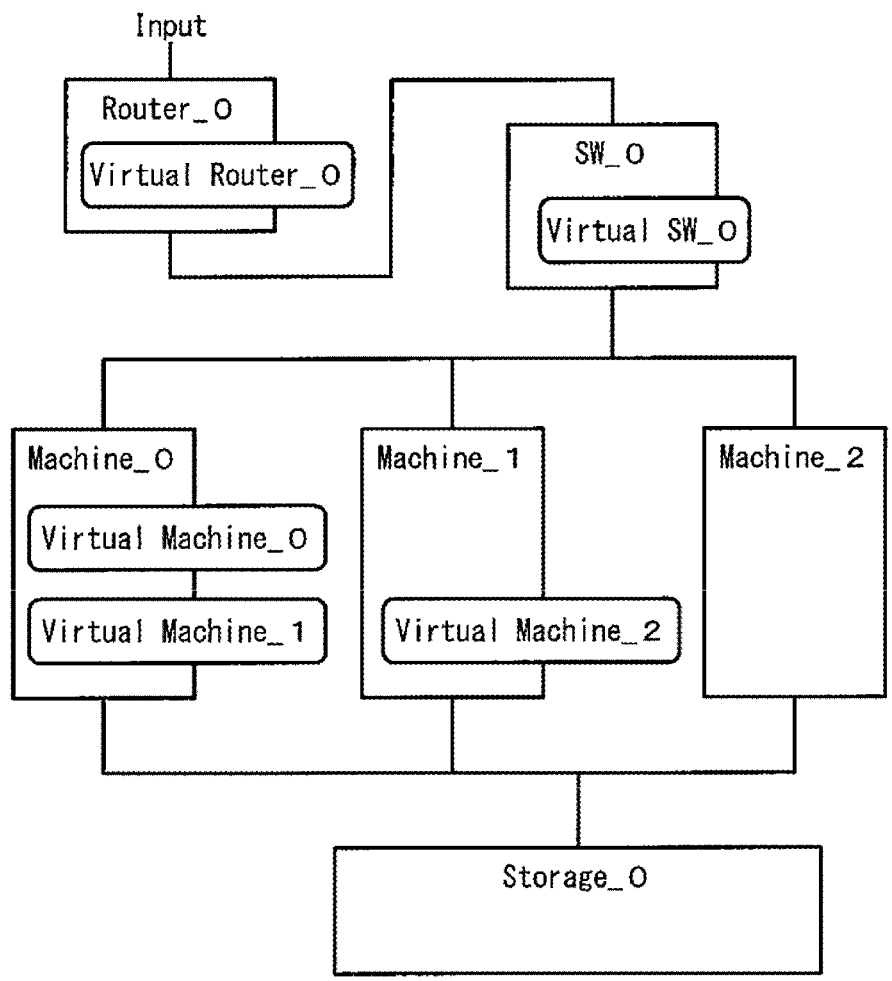
FIG. 3 shows a configuration example of a management target system of Example 1.
Figures 6, 7:
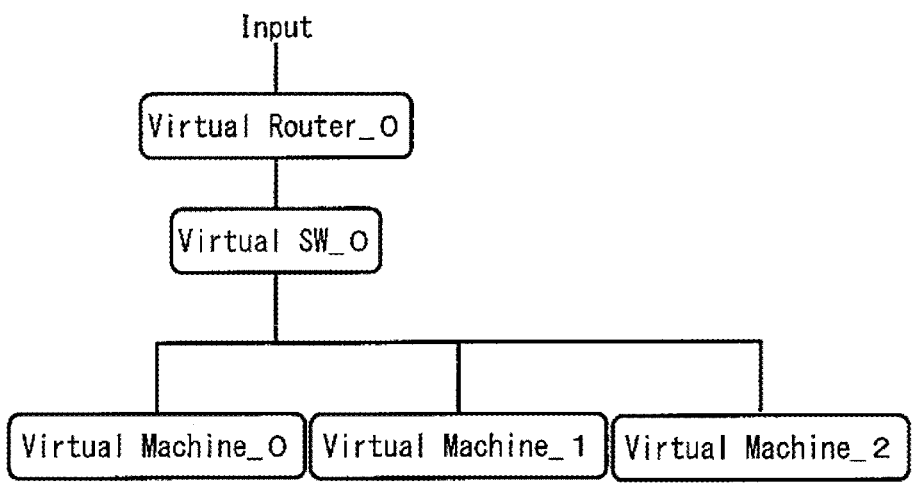
FIG. 6 shows machine specification information of Example 1.
FIG. 7 shows a configuration example of a tenant system of Example 1.

FIG. 3 shows a system configuration example of a management target system. FIGS. 4, 5, and 6 show configuration information of the management target system illustrated in FIG. 3. FIG. 7 shows a configuration example of a tenant system included in the management target system, and FIG. 8 shows configuration information of the tenant system illustrated in FIG. 7.

The system configuration information 231 includes information illustrated in FIGS. 4, 5, 6, and 8. The system configuration information 231 may be manually input by the manager of the computer system, or the like, or may be generated by any tool or utility. For example, the monitoring agent may collect and generate information of devices constituting the management target system.

The management target system illustrated in FIG. 3 is constituted of a router (Router_0), a network device and a server devices (Machine_0, Machine_1, Machine_2) of a switch (SW_0), and a storage device (Storage_A). In FIG. 3, in a physical system configuration, as a virtual system configuration, a virtual router (Virtual Router_0) is arranged on Router_0, a virtual switch (Virtual SW_0) is arranged on SW_0, a virtual server (Virtual Machine_0, Virtual Machine_1) is arranged on Machine_0, and a virtual server (Virtual Machine_2) is arranged on Machine_2, Machine_0, Machine_1, and Machine_2 are connected to SW_0, SW_0 is connected to Router_0, and Router_0 is connected to an external network. Input indicates a connection point to the outside of the system, and is a place where an access from the user of the management target system is input. In FIG. 3, although a simple system configuration example is shown, actually, it is considered that many devices are included and connected by a complicated topology such that single failure on the system configuration is not generated, and many virtual systems are further constructed on the devices.

FIG. 4 shows physical system configuration information 400 which is physical system configuration information as a part of the system configuration information 231. The physical system configuration information 400 includes a host name 401 which indicates the name of a physical device constituting the system, a connection destination 402 which indicates a device, to which the device indicated by the host name 401 is connected, and a host type 403 which indicates the type of the physical device constituting the system. The physical system configuration information 400 may include other columns (not shown), for example, may further hold detailed configuration information of a processor or the like, or some of information may not be present.

FIG. 5 shows virtual system configuration information 500 which is virtual system configuration information as a part of the system configuration information 231. The virtual system configuration information 500 includes a virtual host name 501 which indicates the name of a virtual device constituting the system, an arrangement 502 which indicates a host name of a physical device providing a virtual device indicated by the host name, and a host type 503 which indicates the type of a virtual device constituting the system. The virtual system configuration information 500 may include other columns (not shown), for example, may further hold detailed configuration information as information of a processor allocated as a virtual machine, and some of information may not be present.

FIG. 6 shows machine specification information 600 which indicates the specification of a host as a part of the system configuration information 231. The machine specification information 600 illustrated in FIG. 6 includes a host type 601 which indicates the type of a physical device or a virtual device constituting the system, and performance 602 which indicates a catalog specification exhibitable by the host type. The machine specification information 600 may include other columns (not shown), for example, may further hold detailed specification information, such as the operation frequency of the processor constituting the server device or the capacity of the memory, and some of information may not be present. The performance used herein is the throughput processable per unit time, for example, IOPS (Input Output Per Second) for the storage device or FLOPS (Floating-point Operations Per Second) for the server, and in the following description, for simplification of comparison, is defined as the number of requests (Krequest/sec) processable per unit time. For example, information may be created by a method which creates information based on characteristic values described in a catalog. A performance deterioration degree described below is represented in the same unit, and a value indicated by the machine specification information and a value indicated by the performance deterioration degree can be subjected to four arithmetic operations, such as addition and subtraction.

FIG. 7 shows a configuration example of one tenant system which is constituted using the computer system. The tenant system configuration illustrated in FIG. 7 is constituted of Virtual Router_0, Virtual SW_0, Virtual Machine_0, Virtual Machine_1, and Virtual Machine_2. Virtual Machine_0, Virtual Machine_1, and Virtual Machine_2 are connected to Virtual SW_0, Virtual SW_0 is connected to Virtual Router_0, and Virtual Router_0 is connected to Input. Input indicates a connection point to the external network and is a place where an access from the user of the tenant system is input.

In FIG. 7, although a simple tenant system configuration is shown, actually, it is considered that more devices constitute a tenant system and are connected by a complicated topology such that a single point of failure on the tenant system configuration is not generated, thereby constituting the tenant system. In FIG. 7, although only the system configuration of one tenant system is shown, actually, it is considered that a plurality of tenant system having different tenant system configurations constitute a management target system.

FIG. 8 shows tenant system configuration information. Tenant system configuration information 800 illustrated in FIG. 8 includes a host name 801 which indicates a device name constituting a tenant system, a connection destination 802 which indicates a connection destination of a host, and a host type 803 which indicates the role of the host on the tenant system. Other columns (not shown) may be included. When the management target system includes a plurality of tenant systems, configuration information illustrated in FIG. 8 may be held for each tenant system. The tenant system configuration information 800 may be created using, for example, a configuration management program or the like, or may be manually created by the operation manager or the like.

The task information 232 includes information illustrated in FIGS. 9 and 10. FIG. 10 shows task management information 1000 which indicates detailed information relating to the content of a task. FIG. 9 shows task schedule information 900 which indicates schedule information of a task scheduled to be executed in the management target system or the tenant system included in the management target system.

The task management information 1000 illustrated in FIG. 10 includes a task ID 1001 for identifying information, a process content 1002 which indicates the process content of a task, a required execution time 1003 which indicates a time estimated from the start of execution of a task until execution is completed, an operation load 1004 which indicates a load on the system with the execution of the task, and a host type 1005 which indicates a host type of a physical or virtual device to be operated. The task management information 1000 may be manually input by the manager of the computer system, and for example, may be generated by any tool or utility by executing a task multiple times while monitoring the system actually to statistically calculate a required time or a load on the system.

For example, even if the task IDs T03 and T04 have the same process content, information stored in the task management information 1000 may be stored for respective tasks having different features like T03 where a load is high and a process ends in a short time and T04 where a load is low and a long process time is required. Here, the operation load is the number of requests (Krequest/sec) per unit time, and is, for example, a value which can be added to a load applied to the management target system or the tenant system due to an access from the external network, such as an access from Input shown in FIGS. 3 and 7. The operation load can be determined and stored in advance, for example, by means for actually executing a task to measure the degree of process performance deterioration of the system and calculating a load corresponding to the degree of performance deterioration from the degree of performance deterioration using system performance deterioration degree information 1200 described below.

The task schedule information 900 illustrated in FIG. 9 includes a schedule ID 901 for identifying information, a task ID 902 which indicates the correspondence with the entry of task management information, an operation target 903 which indicates a component to be processed of a task, and scheduled execution date and time 904 when the execution of a task is scheduled. The task schedule information 900 may be manually input by the manager of the computer system, or may be created by any tool or utility, and for example, the management server may automatically calculate an execution schedule of a task based on management information (not shown). This table may be created for each tenant system.

The load-performance correspondence information 233 is constituted from information illustrated in FIGS. 11, 12, and 13. FIG. 11 shows expected system performance information 1100 which indicates a system configuration and expected performance for each configuration. FIG. 12 shows system performance deterioration degree information 1200 which indicates the correspondence between a system load and a performance deterioration degree. FIG. 13 shows processing load information 1300 which indicates the correspondence between a system load and the throughput during processing in each host. The load-performance correspondence information 233 may be calculated by means for measuring peak performance exhibitable in the system configuration through a load test and may be manually input by the manager of the computer system, or may be generated by any tool or utility. It should suffice that numerical values in a range for performance estimation are stored. For example, when peak performance exhibitable by the system is different according to a transaction (here, a transaction is an example of a load), such as a read/write ratio or data size around a request, different kinds of load-performance correspondence information 233 may be held according to the feature of the load. The tenant system configuration illustrated in FIG. 7 corresponds to a row where a configuration ID is C04.

The expected system performance information 1100 illustrated in FIG. 11 includes a configuration ID 1101 which is an identifier of a system configuration, a configuration content 1102 which indicates a device group constituting a system, and expected performance 1103 which indicates peak performance expected to be exhibited in the system configuration. Similarly to the performance 602 of the machine specification information 600, the performance used herein is the throughput processable in the system per unit time, for example, IOPS for the storage, FLOPS for the server, or the like, and indicates the number of requests (Krequest/sec) processable in the system per unit time. The expected system performance information 1100 is also used as information indicating a configuration content of a system associated with a configuration ID.

The system performance deterioration degree information 1200 illustrated in FIG. 12 indicates a performance deterioration degree for each system configuration when a load which is a process request from the external network to the management target system or the tenant system. A load 1201 which indicates the magnitude of a load applied to the system from the outside, and a performance deterioration degree 1202 which indicates the width of a variation in a performance value actually exhibitable when the load 1201 is applied are included. The load used herein is the throughput (Krequest/sec) required for the system per unit time, for example, an I/O request to a volume for the storage, an access request amount to a web server for the web server, or a data process request amount of a task using a server for an AP server. The performance deterioration degree is represented by the same unit (Krequest/sec) as the performance 602 of the machine specification information 600 or the expected performance 1103 of the expected system performance information 1100, and can be determined by, for example, a method which actually measures the degree of performance deterioration through a load test or the like. A calculation can be performed to subtracting the performance deterioration degree 1202 as the width of the variation in system performance from the expected performance 1103 indicating peak performance expected in the system to calculate the worst value of performance exhibitable by the system.

The processing load information 1300 illustrated in FIG. 13 indicates a load amount during processing in each device when a load is applied from the outside. A load 1301 which indicates a load as a process request from the outside to the management target system or the tenant system, and a process load 1302 which indicates the amount of a load during processing in each device when the load 1301 is applied to the system are included. Since a load processed in each device is different for each system configuration, information is held for each system configuration ID 1303. The load 1301 and the process load 1302 are represented by the same unit as the load 1201 of the system performance deterioration degree information 1200.

FIG. 17 shows an example of the load trend information 234 which indicates the trend of load information as a process request from the external network to the management target system or the tenant system. The load trend information 234 illustrated in FIG. 17 includes date and time 1701, and a load 1702 which indicates the magnitude of a load applied to the system at the date and time 1701. The management server 201 stores the average value of the load at each time of a day zone calculated from previous load information in the load trend information 234 in advance. In FIG. 17, although the trend of every five seconds every day is shown, the trend of every week or month may be made, and the division of the time zones is not limited thereto. The input of a value adjusted by the system manager may be received based on the calculated average value and stored in the load trend information 234. Furthermore, for example, like load trend information generated based on load information during the last one month and load trend information generated based on load information during the last half year, a plurality of load trends may be held for each period of information acquisition for trend calculation.

FIG. 18 shows the content of the operation policy information 235. The operation policy information 235 stores a policy for automatically changing a system configuration according to the situation of the system used by the tenant without receiving the input of user operation. A policy ID which is an identifier of an operation policy, an automatic execution content 1802 which indicates the execution content of a task executed by the policy, and a task ID 1803 which indicates an identifier of a task executed by the operation policy are included, and at least one of conditions indicating the execution conditions of the operation policy, for example, a condition 1804, a condition 1805, a condition 1806, and the like is included.

Figure 19A:
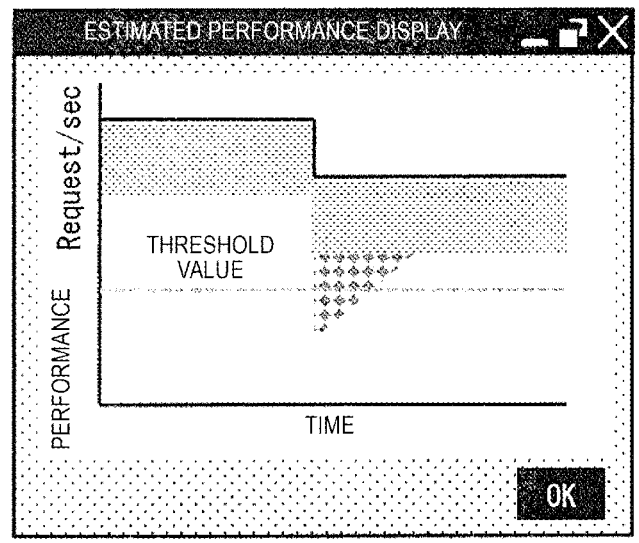
FIG. 19(A) shows a display example of an output screen of Example 1.
Figure 19B:
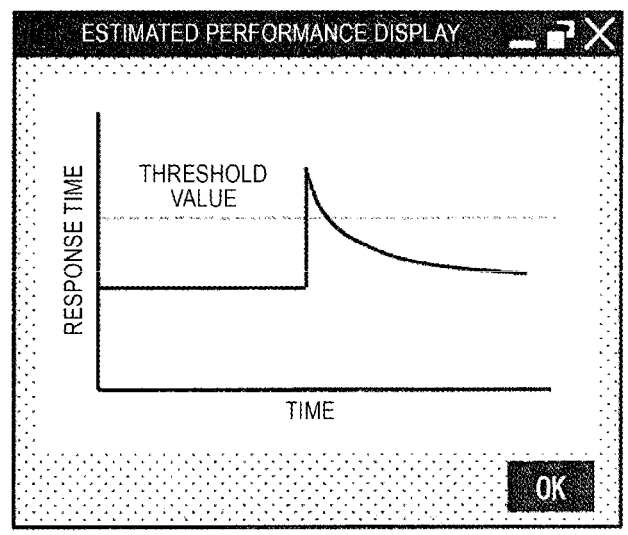
FIG. 19(B) shows a display example of the output screen of Example 1.
Figure 19C:
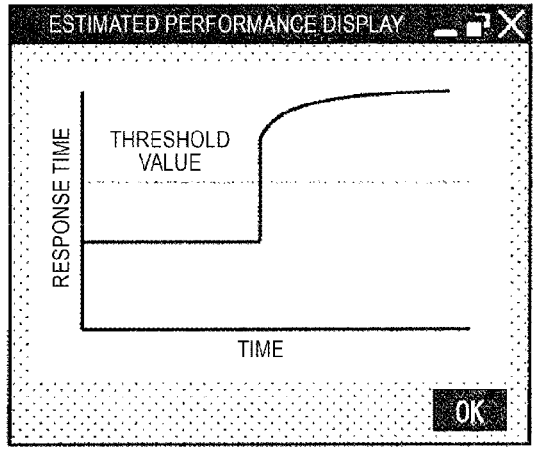
FIG. 19(C) shows a display example of the output screen of Example 1.

FIGS. 19(A), 19(B), and 19(C) are diagrams illustrating the display content of a screen (hereinafter, referred to as an output screen) which outputs the result of the performance estimation process of this example to the output device 215 or the output device 218. The horizontal axis represents time, and it should suffice that a target period during which the performance estimation process is executed is displayed.

The vertical axis of FIG. 19(A) represents performance, and the system performance calculated by the performance estimation process 221 is used. The unit of the performance is the number of requests processable in the system per unit time like the expected system performance 1103 of the expected system performance information 1100. FIG. 19(A) shows an example when performance is represented by bands, and shows a region where the transition of expected performance of the system according to a configuration change is indicated by a solid line and a range of performance deterioration due to a task and a load trend at this time is indicated by dots, and the range of performance deterioration due to an increase in load for a re-request for a process uncompleted at a configuration change place at the time of the configuration change is displayed in a rhombic background pattern. The prediction result of performance is displayed along with a threshold value, for example, SLO or the like. The performance prediction range may not be displayed distinctively, and for example, only a part of the prediction range, such as the predicted worst value or the average value, may be displayed.

FIGS. 19(B) and 19(C) show transition of a response time, and the worst value of a predicted system response time is displayed. The prediction result of the performance is displayed along with a threshold value of, for example, SLO or the like. The vertical axis of FIGS. 19(B) and 19(C) represents a response time, and displays the response time of the system calculated by a response time calculation process. In an output screen example illustrated in FIG. 19(B), while the response time is intermittently increased due to a configuration change of the system, thereafter, the response time converges and the response time is settled into a value smaller than the threshold value. In an output screen example illustrated in FIG. 19(C), the response time of the system is slower than, for example, a time-out period of the system and exceeds the threshold value and is deteriorated, and accordingly, the user is alerted that the response time is likely to be not recovered naturally.

On the output screen, for example, information relating to a configuration change, such as an assumption of a case where a certain VM is degenerated at a certain time, may be displayed as information of a simulation along with graph display. In FIG. 19(B), the time when an excess over SLO is estimated may be displayed, and in FIG. 19(C), an alert to the effect that a present system configuration does not support a configuration change may be displayed. Furthermore, in response to an automatic execution policy of a configuration change task being satisfied as described below, when a performance estimation process is performed in terms of a configuration change by the task, graph display may be displayed as the assumption result when the task is executed along with the situation of the system and the effect that the automatic execution of the task is scheduled.

Figure 20:
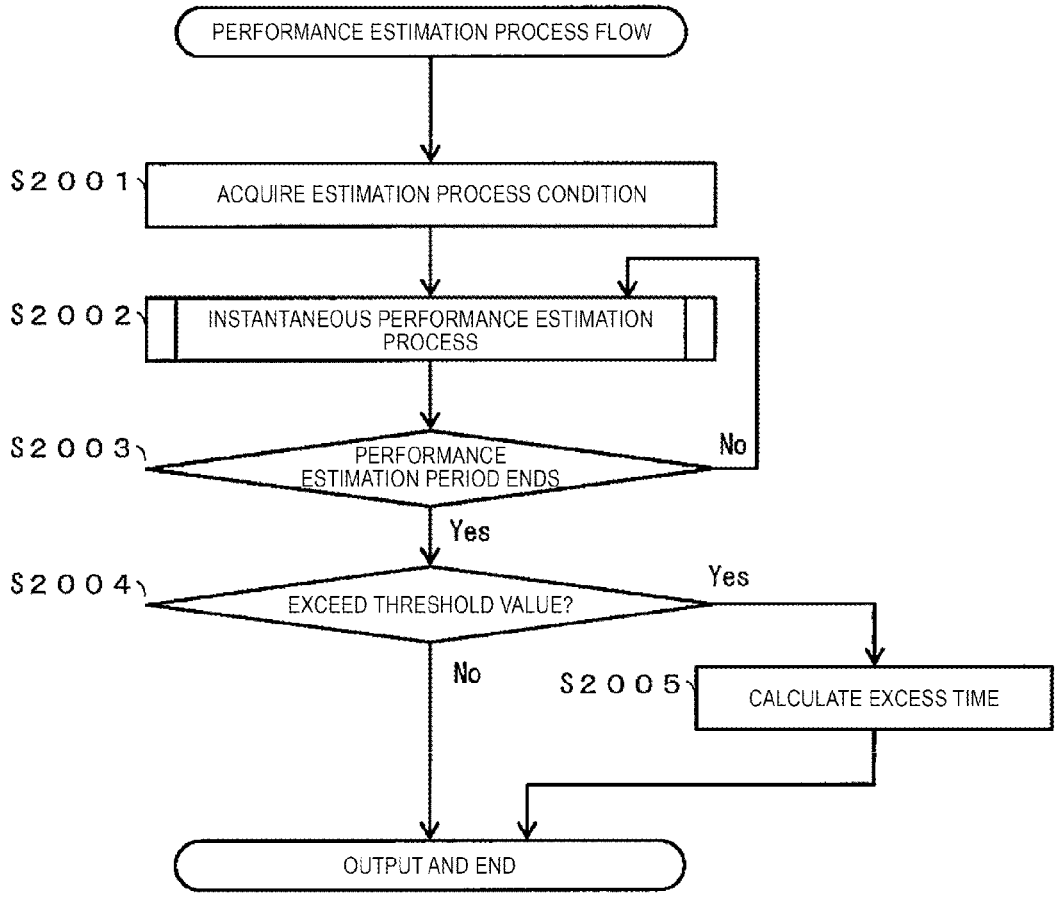
FIG. 20 is a flowchart showing a performance estimation process according to the example.
Figure 21:
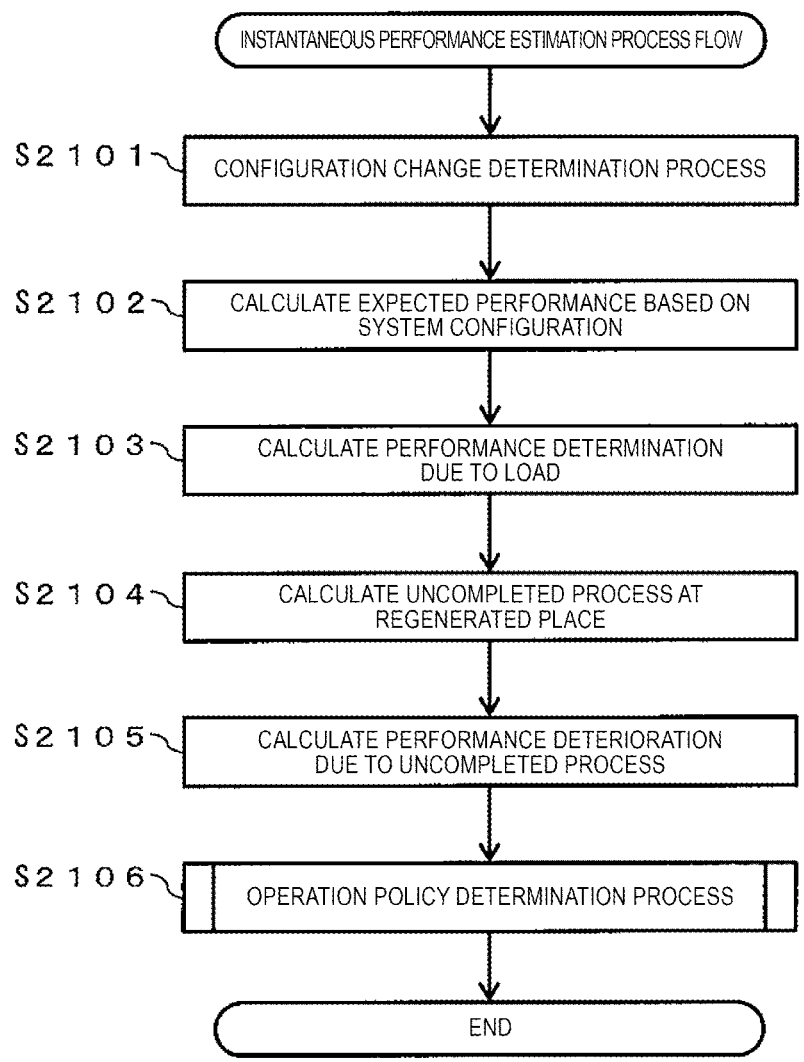
FIG. 21 is a flowchart showing instantaneous performance estimation process according to the example.
Figure 22:
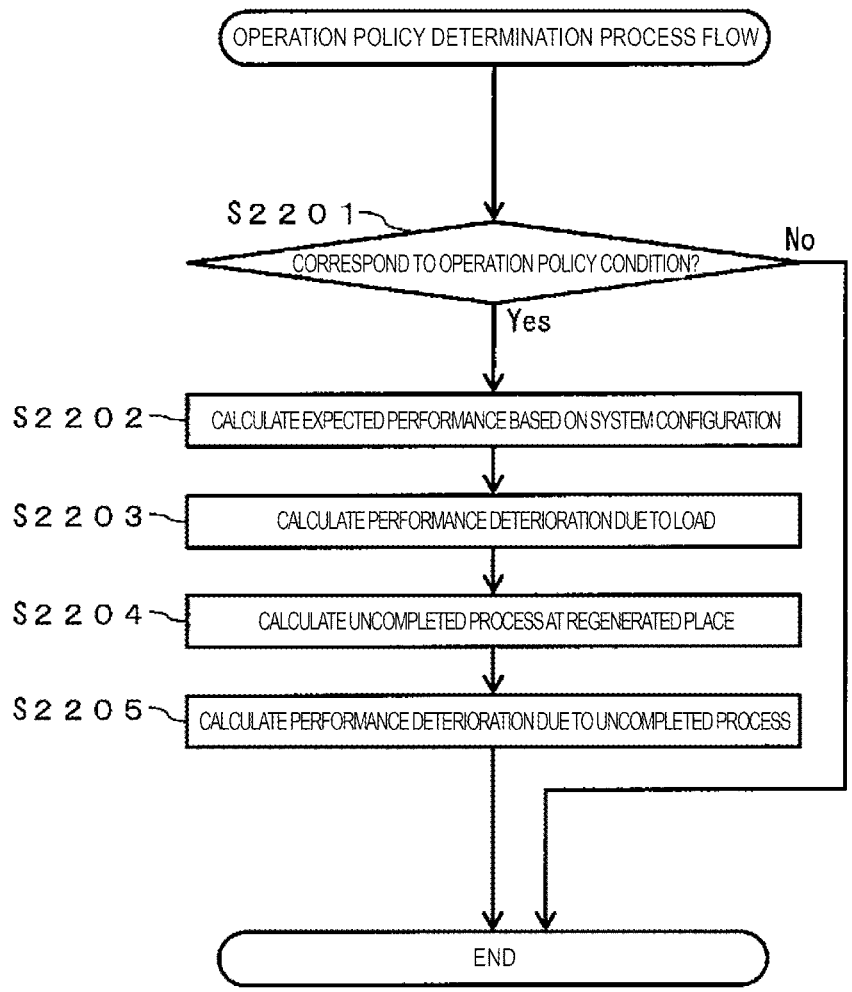
FIG. 22 is a flowchart showing details of an operation policy determination process according to the example.

FIGS. 20, 21, and 22 are an example of a flowchart showing the process content of the performance estimation processing unit 221 of the management server 201. A performance estimation process flow illustrated in FIG. 20 recursively calls an instantaneous performance estimation process flow illustrated in FIG. 21 to calculate the transition of change in the system performance. The instantaneous performance estimation process flow illustrated in FIG. 21 calls an operation policy determination process flow illustrated in FIG. 22, determines whether or not a task is likely to be automatically executed by an operation policy, and when the task is likely to be executed, calculates the degree of performance deterioration due to the load of the task.

FIG. 20 is a flowchart showing a performance estimation process in which the performance estimation processing unit 221 simulates the transition of the system performance in a certain period. In a target period during which performance estimation is performed, the instantaneous performance estimation process which estimates the performance of the system at a certain time (hereinafter, referred to as "estimation target time") is made at each arbitrary time interval. The system configuration of the estimation target time is specified in consideration of the presence or absence of a configuration change up to this time, and the expected performance is calculated. Furthermore, the width of a variation in the system performance caused by a task scheduled to be executed in the system or a load applied to the system from the outside is calculated as the system performance deterioration degree. In addition, when the assumed configuration change is, for example, a configuration change to degenerate the system, for example, VM degeneration, the range of performance deterioration which will be further caused by a load on the system due to a re-request for a process uncompleted in a degenerated component is calculated. It is determined whether or not there is a possibility that the condition of an operation policy for automatically executing a task, such as autoscale, is satisfied as a result of change in the system performance caused by the configuration change, and when it is determined that there is a possibility, a performance value in consideration of the influence of a configuration change or a process load caused by the automatic execution task is calculated. Information relating to the calculated performance at each target time is output as the transition of change in the system performance. The threshold value, for example, SLO or the like may be output along with the transition of change in performance.

The performance estimation process may be executed with the reception of an instruction of the computer system manager by selecting a tenant system with an assumption of a configuration change out of the management target system when the computer system manager plans a configuration change and performing the performance estimation process for the tenant system. For example, in a management system in which an automatic execution policy of a task for executing a configuration change is set along with execution conditions of system performance, a system load, and the like, performance estimation may be executed by any tool or utility by determining about whether or not the execution condition for performance estimation is satisfied before a task is automatically executed, or the like.

In S2001, the performance estimation processing unit 221 acquires, as input information, 1) the configuration ID 1101 of the target system in which the performance estimation process is executed, 2) the target period during which the performance estimation process is performed, 3) the time interval of the estimation target time of instantaneous performance estimation, 4) the host name (the host name 401 or the virtual host name 501) to be managed with an assumption of a configuration change, 5) the assumed time of the configuration change, and 6) the task ID 1001 corresponding to the content of the assumed configuration change.

Information may be respectively acquired by receiving the input from the system manager using the input device 214 or the input device 216 or may be input by any tool or utility. For example, in regard to 1), the system manager may confirm tenant configuration information 800 of the target system to understand the configuration of the target system and input the corresponding configuration ID 1101.

In a configuration in which the performance estimation process is performed before automatic execution of a task, S2001 becomes, for example, the following process.

When a certain tenant system or the like matches the automatic execution policy of the configuration change task, a tool or utility (not shown) notifies the performance estimation processing unit 221 of 1) the configuration ID 1101 of the system scheduled to execute a configuration change by the automatic execution task, 4) the host name subjected to the configuration change, 5) the scheduled time of the configuration change, and 6) the task ID of the scheduled automatic execution task. A configuration in which where the scheduled time of the configuration change has a given extension period until the automatic execution and the execution is scheduled after a given time after matching the policy is considered. In regards to 2) the target period (length) and 3) the time interval, the performance estimation processing unit 221 may have values determined in advance.

When there is a need for estimating the influence of processing of a task stored in the task schedule information 900 in advance, instead of performing estimation assuming an unplanned configuration change, information of 4)-6) may not be received. Alternatively, when performing a simulation before and after the execution of a specific scheduled task, the user may select the schedule ID 901 to receive an input. Furthermore, a process for allowing the user to input and select corresponding information instead of the task ID or the schedule ID and referring to the ID corresponding to the input may be performed.

When the target period is received as the length of the period, the start time of the target period may be calculated by means for subtracting the time of half the target period from the input assumed time of the configuration change (or the execution date and time 904 of the selected task). Furthermore, designation of a specific start or end time may be received.

The host type of the device corresponding to the acquired host name to be managed is acquired with reference to the physical system configuration information 400 or the virtual system configuration information 500 of the system configuration information 231. Furthermore, scheduled schedule information to be executed (being executed or started to be executed) in the target period is acquired with reference to the task schedule information 900. Respective information 1002 to 1005 corresponding to the input task ID 1001 and the acquired scheduled task ID 902 is acquired with reference to the task management information 1000.

In S2002, the instantaneous performance estimation process is executed for the estimation target time, and the follows are calculated.

1) the expected performance in the system configuration at the target time,
2) the degree of performance deterioration as the width of the variation in system performance due to the system load, the task executed by the system, and the influence of the configuration change,
3) when the configuration change is in the degeneration direction, the degree of performance deterioration due to a re-request load of an uncompleted process, and
4) the degree of performance deterioration due to the influence of a task automatically executed based on the operation policy The details of the instantaneous performance estimation process will be described referring to FIG. 21.

In S2003, it is determined whether or not the estimation process is executed at each estimation target time of the entire target period received in S2001. When the instantaneous performance estimation process of the target period is completed, the process progresses to S2004, and otherwise, S2002 is executed again. When returning from S2003 to S2002, a value obtained by adding 3) the time interval acquired in S2001 to the previous estimation target time is set as the next estimation target time.

In S2004, the calculated performance of the computer system is compared with the threshold value of SLA or SLO. When the system performance exceeds the threshold value which may not be undershot, the process progresses to S2005. When the calculated result is compatible with SLA or SLO, the value of instantaneous performance estimation of the target period is output as the transition of change in system performance and the performance estimation process flow ends.

In S2005, when a value exceeding the threshold value is included in the calculation result, instantaneous performance at each time is compared with the threshold value. For example, the time when the system performance exceeds the threshold value is calculated by means for multiplying the number of results where the instantaneous performance exceeds the threshold value and the time interval acquired in S2001, the time when the system performance exceeds the threshold value is output along with the calculated transition of change in the system performance, and the performance estimation process ends.

The performance estimation process may include other processes (not shown). The value calculated in each step may be output, for example, in a format of being stored in a memory or being output to a file.

FIG. 21 is a flowchart showing the details of the instantaneous performance estimation process S2002. The instantaneous performance estimation process may include other processes (not shown), and several steps including S2106 may not be executed.

In S2101, the estimation target time is compared with the assumed time of the configuration change acquired in S2001 and the scheduled time of each configuration change stored in the task schedule information 900, and it is determined whether the estimation target time is before a configuration change (hereinafter, referred to as "pre-configuration change") or the estimation target time is after a configuration change (hereinafter, referred to as "post-configuration change"). When the process content 1002 indicated by the task ID 1001 is, for example, a configuration change to expand the system, such as VM deploy, the time after the required execution time 1003 elapses from the scheduled execution time of the configuration change is regarded as the post-configuration change. When the process content 1002 is a configuration change to degenerate the system, such as VM degeneration, the time after the scheduled execution time of the configuration change is regarded as the post-configuration change. When the process content 1002 does not any configuration change, the time after the configuration change is executed is regarded as the post-configuration change. In all cases, it may be considered that the period from the time when the configuration change is executed until the required execution time elapses is regarded as in-execution and the operation load 1004 due to the configuration change continues to be applied to the system.

In S2102, as the determination result of S2101, the expected performance of the system configuration assumed at the estimation target time is calculated using the load-performance correspondence information 232 and the system configuration information 231. The system configuration of the estimation target time is specified in consideration of whether the estimation target time is before or after the configuration change of each task, and the expected performance 1103 corresponding to the configuration ID 1101 of the expected system performance information 1100 is acquired as the expected performance at the target time. In the case of the post-configuration change, if the change is a degeneration process of the system, the system configuration ID becomes a configuration ID which indicates a configuration content obtained by excluding the host type of the configuration change target device from the configuration content 1102 indicated by the system configuration ID before the configuration change. When the change is an expansion process of the system, the configuration ID indicating a configuration content with a target device added corresponds to the system configuration after the configuration change, and in other processes, the same configuration ID as before the configuration change is set as the configuration ID of the system after the configuration change. It may be determined whether or not the task is a configuration change process in a degeneration direction by a flag (not shown) which is attached to each task ID.

In S2103, the degree of performance deterioration of the system due to the system load, the load according to the execution of the task, and the load according to the configuration change is calculated using the task information 232, the load-performance correspondence information 233, and the load trend information 234. The system load is a process request, such as a task process of a performance estimation target system through an external network or the like or an access to data, and is determined by acquiring a load 1702 at the estimation target time with reference to the load trend information 234. The load according to the execution of the task is a load given to the system by an operation process of the task, and the estimation target time corresponds to the period until the required execution time 1003 of the task management information 1000 elapses from the execution date and time 904 of the task schedule information 900, the operation load 1004 is acquired as the load according to the execution of the task. When a plurality of tasks are execution simultaneously, or the like, the total of the operation load 1004 of a plurality of tasks is handled as the load according to the execution of the task.

The load according to the configuration change is a load applied to the system by a process for realizing an assumed configuration change, and when the estimation target time is in the execution of the configuration change, the operation load 1004 indicated by the task ID 1001 of the configuration change is handled as the load according to the configuration change. The total of the system load, the load according to the execution of each task, and the load according to the configuration change may be handled as the total load (excluding a load according to a re-request described below) applied to the system.

The performance deterioration degree 1202 corresponding to the configuration ID of the system at the estimation target time out of the performance deterioration degree corresponding to the load 1201 according to the calculated total load of the system is calculated as a system performance deterioration degree with reference to the system performance deterioration degree information 1200.

In S2104, a load according to a re-request of an uncompleted process at a degeneration place due to a configuration change is calculated using the load-performance correspondence information 233. With this process step, it is possible to determine a load applied to the system when it is assumed that a request of an uncompleted process generated by rapid degeneration is retransmitted to other components. This process step is executed when the estimation target time is after the configuration change which becomes the degeneration process.

In S2104, the process load 1302 corresponding to the host type 403 or 503 of the configuration ID (the system configuration before the execution of the configuration change) at the estimation target time and the configuration change target device is acquired as the load according to the re-request of the uncompleted process at the degeneration place from the process load 1302 corresponding to the load 1301 according to the total load of the system calculated in S2103 with reference to the processing load information 1300. In regard to the value of the load 1301, a value closest to the value of the total load may be selected from among the values stored in the processing load information 1300.

S2104 may be executed once immediately after the degeneration by the configuration change during the performance estimation process 221, and the setting may be made that setting information (not shown) is held and the second or subsequent time of the loop is not executed. For example, the setting may be made that the number of times is designated such that the process is executed for three times. When the process is performed at a plurality of target times, the amount already processed out of the amount calculated as the uncompleted process immediately after degeneration is calculated based on an instantaneous performance value of the system calculated at the estimation target time to a previous loop process after degeneration, and a subsequent process is performed on the remaining amount of the uncompleted process. As the instantaneous performance value of the time up to the previous time, the worst value may be used.

In S2105, the degree of performance deterioration due to the re-request of the process in an uncompleted state at the degeneration place is calculated using the load-performance correspondence information 233. This step may be executed only when S2104 is executed. A value obtained by adding the total load of the system calculated in S2103 and the load according to the re-request of the process in the uncompleted state calculated in S2104 is set as an instantaneous system load. The performance deterioration degree corresponding to the system configuration ID after the configuration change calculated in S2102 is acquired from the performance deterioration degree 1202 corresponding to the load 1201 according to the instantaneous system load with reference to the system performance deterioration degree information 1200, and a value obtained by subtracting the system performance deterioration degree calculated in S2103 from the acquired performance deterioration degree is calculated as the degree of performance deterioration of the system due to the load of the re-request of the process in the uncompleted state at the degeneration place.

In S2106, the degree of system performance deterioration due to the influence of a task which is automatically executed when the condition of the operation policy information 235 is satisfied with change in the situation of the system is calculated. A value obtained by subtracting the degree of system performance deterioration due to the total load of the system and the degree of performance deterioration due to the load of the re-request in the uncompleted state from the expected performance of the system calculated in S2101 to S2105 is calculated as the worst value within the assumption of the system performance. The calculation result is compared to the condition of the operation policy, and when there is the operation policy satisfying the condition, it is determined that the task is likely to be automatically executed by the policy, and the degree of system performance deterioration due to the influence of the task is calculated. The details of this step will be described referring to FIG. 22.

The result calculated by the above instantaneous performance estimation process may be output, for example, in a format of being stored in a memory or being output to a file.

FIG. 22 is a flowchart showing the details of the operation policy determination process of S2106. In this process flow, performance estimation in consideration of the load of the task automatically executed based on the operation policy or the configuration change is executed. Even though the configuration change by the automatic execution is performed for improvement of the situation of the system, a load according to the configuration change is applied, whereby the performance is likely to be further deteriorated. At the time of performance estimation, calculation is performed in consideration of the automatic execution based on the operation policy, whereby the validity of the policy can also be evaluated in advance. For example, as a result of the automatic execution, when SLA is not satisfied, it is understood that the policy is not valid.

At the instantaneous performance estimation target time, the degree of system performance deterioration due to the operation load 1004 of the task to be automatically executed when the condition, such as the condition 11803 of the operation policy information 235 is satisfied is calculated. The operation policy determination process may include other processes (not shown). When a task is automatically executed, this means that the task is executed without requiring the reception of user operation by the manager or the like when a condition of an operation policy determined in advance is satisfied.

In S2201, in regard to the operation policy stored in the operation policy information 235, it is determined whether or not all conditions, such as the conditions 1804 and 1805 of the operation policy are satisfied. If all conditions are not satisfied, the automatic execution of the task is not made. When calculating the influence on the performance of the computer system, the period (the period from the time when the condition of the operation policy is initially satisfied until the required execution time 1003 of a task to be executed elapses) from when the condition of the operation policy is satisfied at first in the target period until the execution of the task which is automatically executed by the policy is completed is regarded as the execution period of the task. For the execution period of the task, the operation load 1004 of the task is excessively applied to the system. After the execution period of the task, for example, if setting information (not shown) is held that the same operation policy is not valid for a given period such that the same task is not automatically executed for ten minutes, an exception process for removing a specific operation policy in the operation policy determination process from a determination target according to the content may be performed. The exception process has the effect of solving a problem that the same configuration change is often executed by the same operation policy. When it is determined in S2201 that there is no operation policy where all conditions are satisfied, the operation policy determination process flow ends, and when all conditions of any operation policy are satisfied, the process progresses to S2202.

In S2202, similarly to S2102, the expected performance of the system based on the system configuration is calculated. When the task which is automatically executed based on the operation policy is a process for performing a configuration change and degenerating the system, for the execution period of the task and after the end of the execution of the task, the expected performance 1103 of the configuration ID 1101 of a system configuration obtained by subtracting a component degenerated by the task from a system configuration before the execution of the task is acquired. When the task which is executed by the operation policy applies a configuration change to the system and a process for expanding the system is performed, the expected performance of a system configuration before the execution of the task is acquired for the execution period of the task, and after the execution period of the task, the expected performance 1103 of the configuration ID 1101 of the system configuration for a component added to the system configuration indicated by the system configuration ID by the task is acquired.

In S2203, in the system configuration determined in S2202, the performance deterioration degree 1202 according to the load is acquired with reference to the system performance deterioration degree information 1200. The load amount obtained by adding the total load of the system described above and the operation load 1005 by the task executed by the operation policy may be used as the load 1201 for the execution period of the operation policy, and the total system load described above may be used as the load 1201 after the end of the execution period of the operation policy.

In S2204, when the task which is executed by the operation policy is the process in the degeneration direction, the throughput of the request in the uncompleted state by a device degenerated by the task is calculated by the same method as S2104.

In S2205, the degree of performance deterioration due to the re-request load of the process in the uncompleted state calculated in S2204 is calculated by the same method as S2105.

The expected performance of the system, the degree of performance deterioration due to the load, and the degree of performance deterioration due to the re-request load of the process in the uncompleted state calculated by the operation policy determination process may be updated and output, for example, by a method of overwriting and holding the values calculated in S2102, S2103, and S2105.

A specific example of the above performance estimation process will be described. For example, when it is assumed that a configuration change, called degeneration of Virtual Machine_2, where the task ID is T05 is executed at 08:00:00, Oct. 30, 2013 for a tenant system where the configuration ID illustrated in FIG. 7 is C04, one minute before and after the execution of the configuration change is set as the target period, and the input of information of a simulation of the transition of change in system performance is received at the estimation target time at an interval of five seconds. The host type of Virtual Machine_2 to be VM_B is acquired with reference to the virtual system configuration information 500 (S2001).

The instantaneous performance of the tenant system at an interval of five seconds from 07:59:00, Oct. 30, 2013 to 08:01:00, Oct. 30, 2013 is calculated (S2002).

An example of the instantaneous performance estimation process where 08:00:00, Oct. 30, 2013 is the target time will be described. In S2101, first, since the instantaneous performance estimation target time is a scheduled time of a configuration change, and VM degeneration of the process content 1002 corresponding to the task ID T05 of an assumed task is a configuration change in a degeneration direction, a system configuration after the configuration change is acquired. The configuration content 1102 of a system configuration in which VM_B as the host type of Virtual Machine_2 to be degenerated is subtracted from the configuration of the system configuration ID C04 before the configuration change is searched with reference to the expected system performance information 1100, and C01 is selected.

In S2102, expected performance 2.0 [K Request/sec] in the system of C01 is acquired from the expected system performance information 1100.

In S2103, first, the load to the system at 08:00:00, Oct. 30, 2013 being 1.3 [K Request/sec] is acquired from the load trend information 234. It is examined whether or not there is a task being executed at 08:00:00, Oct. 30, 2013 from the task information 232. Since the execution date and time 904 of the task of the schedule ID S01 is 07:00:00, Oct. 30, 2013, and the required execution time 1003 of the task of the task ID C04 is two hours, the task is being executed at 08:00:00, Oct. 30, 2013, and a load corresponding to 0.2 [K Request/sec] of the operation load 1004 is applied to the system. It is understood that the load according to the process of the assumed configuration change corresponds to 0.1 [K Request/sec] of the operation load 1004 of the task ID T05 from the task management information 1000. The calculated system load, the load according to the execution of the task, and the load according to the configuration change are added, and the total system load applied to the system at the moment the configuration change is executed is calculated corresponding 1.6 [K Request]. Next, the performance deterioration degree in the system of C01 when the load to the system is 1.6 [K Request] is calculated to be 1.0 [K Request/sec] from the system performance deterioration degree information 1200.

In S2104, since the assumed configuration change is VM degeneration, the throughput of the request in the uncompleted state at the degeneration place is calculated. Since the host type of Virtual Machine_2 at the degeneration place is VM_B, the load amount 0.8 [K Request] during processing in VM_B when the total load of the system of C04 which is the system configuration before the configuration change is 1.6 [K Request] is acquired with reference to the processing load information 1300.

In S2105, the degree of performance deterioration due to the re-request of the process in the uncompleted state at the degeneration place is calculated. The total load 1.6 [K Request] of the system at the moment the configuration change is executed and 0.8 [K Request] which is the process in the uncompleted state at the degeneration place are added together, whereby an instantaneous load of the system is calculated to be 2.4 [K Request]. The degree of performance deterioration of the system of the system configuration C01 when the calculated instantaneous load of the system of 2.4 [K Request] is applied is acquired to be 1.8 [K Request/sec] from the system performance deterioration degree information 1200, and the performance deterioration degree of the system of 1.0 [K Request/sec] calculated in S2103 is subtracted from the performance deterioration degree of 1.8 [K Request/sec] calculated in S2105, whereby the degree of performance deterioration due to the re-request in the uncompleted state at the degeneration place is calculated to be 0.8 [K Request/sec].

A specific example of the operation policy determination process of S2106 will be described. A policy with the policy ID P01 of the operation policy 235 has three conditions. It is understood from the tenant configuration information 800 that Web servers constituting a tenant are two of Virtual Machine_0 and Virtual Machine_1 after a configuration change, and this corresponds to the condition 1805. Referring to the virtual system configuration information 500, the host type of Virtual Machine_0 and Virtual Machine_1 is VM_A. It is understood from the processing load information 1300 that, when the instantaneous load of the system 2.4 [K Request] is applied, the load during processing in VM_A with the system configuration ID of C01 is 1.0 [K Request], and the condition 1804 is satisfied. The task ID of the task to be executed by the operation policy P01 is T01. Referring to the task management information 1000, the host type of the device to be deployed by T01 is VM_A. Referring to the physical system configuration information 400, the host type of Machine_0 is Server_A, and referring to the virtual system configuration information 500, there are two VM_A in Machine_0. From the machine specification information 600, since the performance of Server_A is 4.0 [Krequest/sec], and the performance of VM_A is 2.0 [Krequest/sec], there is a free capacity only for deploying VM_A in Server_A, and the condition 1806 is satisfied. From above, since the task 101 is automatically executed based on the policy ID P01, the determination result in S2201 is Yes.

In S2202, the expected performance of the system is calculated. Since the task which is automatically executed based on the operation policy is VM deploy, as the expected performance of the system, expected performance of the configuration of C01 which is the system configuration calculated by the process until S2105 is calculated. It is understood from the expected system performance information 1100 that the system expected performance of the system of C01 is 2.0 [Krequest/sec].

In S2203, the degree of performance deterioration due to the load applied to the system is calculated. The process load of the task which is automatically executed based on the operation policy is 0.1 [Krequest/sec] which is the operation load of T01 from the task management information 1000. If the process load of the task which is automatically executed based on the operation policy and the total instantaneous load of the system calculated by the process until S2105 are added, 1.7 [Krequest] is obtained. The system performance deterioration degree in the configuration of C01 when the load of 1.7 [Krequest] is applied instantaneously is 0.85 [Krequest/sec] from the system performance deterioration degree information 1200.

In S2204, the throughput of the request in the uncompleted state of the degeneration place is calculated. The task which is executed by the operation policy is VM deploy, the throughput in the uncompleted state is not increased, the throughput 0.8 [Krequest] of the uncompleted state at the degeneration place calculated in S2105 is used.

In S2205, the degree of performance deterioration due to the re-request of the process in the uncompleted state at the degeneration place is calculated. The instantaneous load of the system is 2.5 [Krequest] from the total load 1.7 [Krequest] of the system calculated in S2202 and the throughput 0.8 [Krequest] of the uncompleted state at the degeneration place calculated in S2203. From the system performance deterioration degree information 1200, when the instantaneous load applied to the system is 2.5 [Krequest], the performance deterioration degree in the system of the configuration of C01 is 1.9 [Krequest/sec]. The performance deterioration degree of 0.85 [Krequest/sec] calculated in S2203 is subtracted from the performance deterioration degree 1.9 [Krequest/sec] calculated in S2205, whereby, when the task is automatically executed based on the operation policy, the degree of performance deterioration due to the re-request of the process in the uncompleted state at the degeneration place can be calculated to be 1.05 [Krequest/sec].

With these processes, the degree of performance deterioration in consideration of the load of the task executed by the operation policy can be calculated. The degree of performance deterioration due to the load applied to the system and the degree of performance deterioration due to a re-access of the process in the uncompleted state at the degeneration place are subtracted from the expected performance of the system, thereby calculating the worst value of the performance of the system to be 0.1 [K Request/sec].

In S2003, it is determined whether or not a performance estimation period ends. Since the estimation period during which the target time of instantaneous performance estimation of S2002 is 08:00:00, Oct. 30, 2013 is until 08:01:00, Oct. 30, 2013, it is determined to be No, and in the next instantaneous performance estimation process, S2002 is executed with 08:00:05, Oct. 30, 2013 as the target time.

In S2004, it is determined whether or not the transition of change in system performance calculated by the process until S2003 exceeds a threshold value. As the threshold value, when it is defined that the system performance of 0.3 [K Request/sec] is maintained as SLA, the worst value of the system performance at the moment the configuration change is executed is 0.1 [K Request/sec], and it is determined that the threshold value is exceeded.

In S2005, the number of times where the worst value of the calculated instantaneous performance falls below the threshold value is counted as the number of times of incompatibility, the number of times of incompatibility is multiplied by five seconds as an interval of the execution of instantaneous performance estimation, thereby calculating the time when the system performance is incompatible with SLA.

In this example, the same applies to estimation of system performance assuming that a server is down due to the occurrence of server failure and the system is degenerated. In this case, a host with an assumption of the occurrence of failure in S2001 and an assumed failure occurrence time may be received, and the same process as described above may be performed.

With the above process, it is possible to perform performance evaluation with an assumption of a configuration change to the configuration of a tenant. When the threshold value, such as SLO, is exceeded, it is also possible to understand how much of time is exceeded, and to evaluate availability of the tenant when failure occurs in a present configuration or the validity of a configuration change of the tenant scheduled to be executed. When an operation policy is set for automatic execution of a configuration change according to a dynamic situation of the system, the performance is estimated in consideration of the load of the configuration change, and the validity of the operation policy can also be evaluated.

Figure 23:
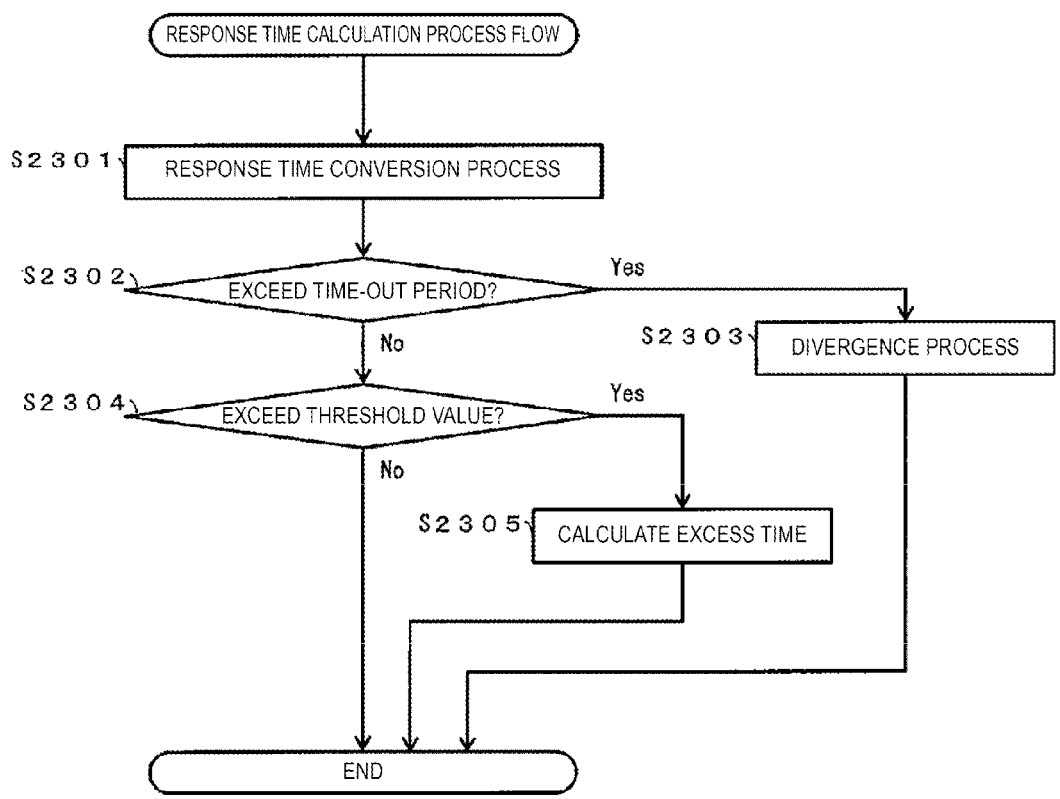
FIG. 23 is a flowchart of a response time calculation process according to the example.

FIG. 23 is a flowchart of an example of a process by the response time calculation processing unit 222 in this example. A response time change process may include other steps (not shown), or several steps may not be provided.

First, in S2301, a response time to a process request is calculated at each target time of the estimation target time based on the performance value calculated in the performance estimation process. Specifically, for example, an expected response time per request may be calculated by the reciprocal of the performance value which is the number of request processes per unit time calculated by the instantaneous performance estimation process, and a correspondence table of the performance value calculated by the performance estimation process (not shown) and the response time may be held and the response time may be calculated. As the performance value, the worst value in consideration of the calculated performance deterioration degree may be used, or the average value of the expected performance and the worst value may be calculated and used as an instantaneous performance value.

S2302 is, for example, a process for, when the setting of a time-out period of a request (not shown) is stored, determining whether or not the system response time to the process request exceeds the time-out period. When the system response time exceeds the time-out period of the request (Yes), the process progresses to S2303, and when the system response time does not exceed the time-out period of the request (No), the process progresses to S2304.

S2303 is, for example, a process which is performed when the system response time exceeds the time-out period of the request in a system where the policy setting is made that a re-request for the same process request is automatically transmitted when a request is not processed after the lapse of the time-out period. If the time-out period is exceeded once, a case where a re-request is repeated, the load to the system continues to be increased, the throughput of the system is exceeded, and the response time continues to be deteriorated unless the situation is improved is considered. For this reason, the response time at the time after the system response time exceeds the time-out period is replaced from the value calculated in S2301 to an uncertain value or the maximum value of the calculated system response time, whereby an output indicating prediction that the system response time is not recovered to be equal to or less than the time-out period. With this, like FIG. 19(C), it is possible to show the user of the system that the system configuration change significantly affects the response time. After the execution of S2303, the calculated system response time is output, and the response time calculation process ends.

S2304 is, for example, a process for, when the target value of the response time to be exhibited by the system is stored as SLO information (not shown), comparing the target value of the response time determined by SLO with the calculated system response time and determining whether or not the system response time exceeds the target value (a value incapable of attaining a target). When the system response time exceeds the target value (Yes), the process progresses to S2305, and when the system response time does not exceed the target value (No), the calculated response time is output and the response time calculation process ends.

In S2305, when the system response time exceeds the target value, the time for which the system response time exceeds the target value is calculated as an excess time. The excess time is calculated, for example, by a method of drawing the calculated response time and a threshold value in a graph and determining the excess time from an cross point of the response time and the threshold value. After the execution of S2305, the calculated system response time and the excess time are output, and the response time calculation process ends.

The result calculated by the response time calculation process may be output, for example, in a format of being stored in a memory, being stored in a file, or being displayed on a GUI.

Figure 24:
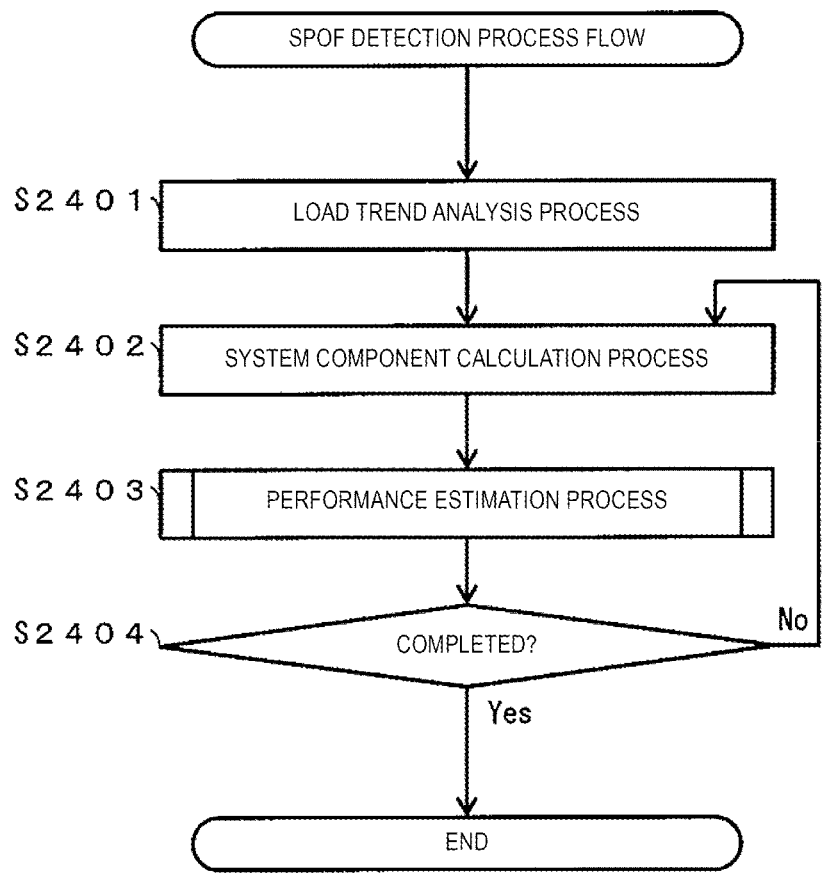
FIG. 24 is a flowchart showing a SPOF detection process according to the example.

FIG. 24 is a flowchart showing a SPOF detection process for detecting the presence or absence of a single point of failure of the system in this example. The SPOF detection process may include other steps (not shown), or several steps may not be provided.

The SPOF detection process is a process for detecting a SPOF on a performance plane in the entire tenant system or IT system. For example, in the tenant system configuration illustrated in FIG. 7 realized in the system configuration illustrated in FIG. 3, when a performance estimation process is executed in a configuration in which Virtual_Machine_0 where the type 803 of the tenant configuration information 800 is a Web server is degenerated, and there are two hosts where the type 803 of the host constituting the tenant system is a Web server, a process for determining whether or not the response time determined in SLO information (not shown) or the target value of performance as the request amount processable per unit time is compatible is executed for each component, and it is determined whether or not there is a SPOF in terms of performance.

In S2401, for example, the maximum value for the last one month out of the load 1702 of the load trend information 234 is determined, and the system load is calculated.

In S2402, for example, when the SPOF detection process is executed for the tenant system, a host of a tenant system with an assumption of degeneration is selected by selecting the hosts described in the tenant configuration information 800 in an ascending order.

In S2403, the result of adding the value calculated in S2401 and a load of an operation to degenerate the host selected in S2402 is set as a system load. As a configuration change where the operation to degenerate the host selected in S2402 is executed, a configuration before degeneration in a system for degenerating the host selected in S2402 is handled as a pre-configuration change, a configuration after degeneration in the system for degenerating the host selected in S2402 is handled as a post-configuration change, and the performance estimation process flow is executed. With this process, at the time when the host selected in S2402 is degenerated, when the worst performance value of the system calculated by subtracting the performance deterioration degree due to the system load and the degree of performance deterioration due to a re-access of an uncompleted process from the expected performance of the system exceeds the threshold value, the host selected in S2402 output the worst performance value as a single point of failure on the system performance plane.

In S2404, in all hosts of the system for detecting a single point of failure of the system, it is determined whether or not the process of S2403 is executed. When the execution of the process of S2403 is completed in all hosts, the single-point-of-failure place calculated in S2403 is output to a file, a GUI, or the like, and the SPOF detection process ends. When the process of S2403 is not executed in all hosts, the process of S2402 is executed again.

EXAMPLE 2

The instantaneous performance estimation process using the load-performance correspondence information 233 in Example 1 have approximated the amount of load applied to a configuration change place when a configuration change of the computer system occurs to the throughput of the uncompleted state. In Example 2, a process queue or the like is considered, whereby the approximation accuracy of the throughput uncompleted at the time of a configuration change is increased.

Figure 15:
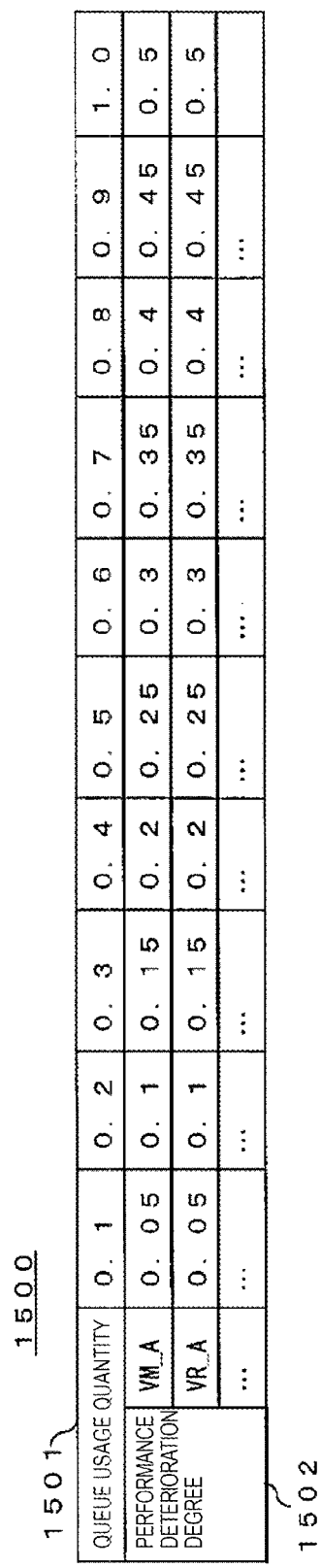
FIG. 15 shows queue usage quantity-performance correspondence information of Example 2.
Figure 16:
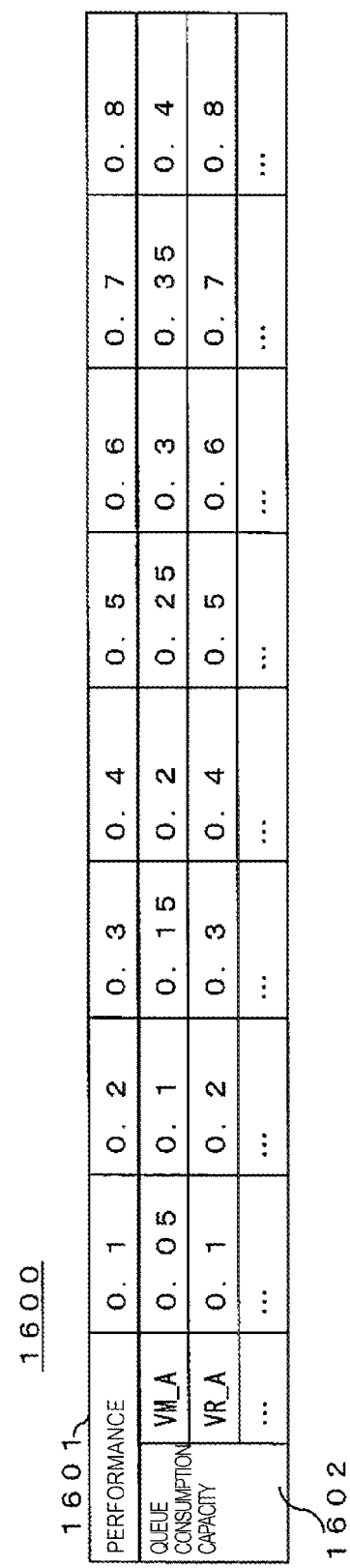
FIG. 16 shows a performance-queue consumption capacity correspondence table of Example 2.

FIGS. 14, 15, and 16 are modification examples of the load-performance correspondence information 233. When the load-performance correspondence information 233 is used in Example 2, it is possible to calculate the throughput of the uncompleted state according to rapid degeneration with excellent accuracy in consideration of that a request from the user which is processed by the computer system is queued.

FIG. 14 shows load-queue usage quantity correspondence information 1400 which indicates the correspondence relationship of the usage of the queue in each post when a load is applied to a tenant system. The load-queue usage quantity correspondence information 1400 includes a load 1401 and a queue usage quantity 1402. Similarly to Example 1, the load is the number of requests to the system. The queue usage quantity is the throughput in a queue of each server per unit time, and is the number of requests stored in the queue. The queue usage quantity 1402 may be held for each device constituting the system.

FIG. 15 shows queue usage quantity-performance correspondence information 1500 which indicates the correspondence of the usage of the queue and the degree of performance deterioration of the system at this time for each host in the tenant system shown in FIG. 7. The queue usage quantity-performance correspondence table 1500 includes a queue usage quantity 1501 which indicates the queue usage quantity of each host, and a performance deterioration degree 1502 which indicates the degree of performance deterioration of the system when the device is bottlenecked. The performance deterioration degree 1502 may be held for each device constituting the system. Similarly to the queue usage quantity 1402 of the load-queue correspondence table 1400, the queue usage quantity is the number of requests stored in the queue of each device. Similarly to the performance deterioration degree 1202 of the system performance deterioration degree information 1200, the performance deterioration degree is the value of the width of a variation in system performance when a load is applied.

FIG. 16 is a performance-host queue consumption capacity correspondence table 1600 which indicates the correspondence relationship of the usage of the queue consumed in each host when the system performance is exhibited in the tenant system shown in FIG. 7. The performance-host queue consumption capacity correspondence table 1600 includes performance 1601 which indicates system performance, and a queue consumption capacity 1602. The queue consumption capacity 1602 may be held for each device constituting the system. The queue consumption capacity is the number of requests stored in the queue processable in each device per unit time. Accordingly, when the queue consumption capacity 1602 corresponding to the system performance 1601 when the load 1401 is applied is smaller than the queue usage quantity 1402 when the load 1401 of the load-queue usage quantity correspondence table is applied, the total amount of the process stored in the queue of each device increases.

The load-performance correspondence information 233 illustrated in FIGS. 14, 15, and 16 may be manually input by the manager of the computer system by storing a value calculated through a statistical process of measured values obtained through monitoring during operation of the computer system, or may be generated by any tool or utility. For example, since it is generally known that the correspondence relationship between the load and the queue usage quantity, the correspondence relationship between the queue usage quantity and performance, or the correspondence relationship between performance and the queue consumption capacity of the host varies according to the feature of the load, such as a read/write ratio, the load-performance correspondence information 233 may be held for each feature of the load, or any tool or utility for adjusting the value of the load-performance correspondence information 233 according to the feature of the load may be held.

S2103, S2104, S2105, and S2106 of the instantaneous performance estimation process using the above load-performance correspondence information 233 in Example 2 are different from the instantaneous performance estimation process in Example 1. Other processes may be the same as those in Example 1.

In Example 2, in S2103, the range of performance deterioration due to the load applied to the system is calculated using the task information 232, the load-performance correspondence information 233, and the load trend information 234. Specifically, first, the calculation of the system load is performed by the same method as S2103 in Example 1. Next, a load 1901 of the load-performance correspondence information 233 is compared with the calculated system load, and the queue usage quantity 1402 is acquired. The queue usage quantity 1501 of the load-performance correspondence information 233 is compared with the acquired queue usage quantity to acquire the performance deterioration degree 1502 of each host constituting the system. Next, the largest value of the performance deterioration degree out of the acquired performance deterioration degree 1502 in each host is calculated, and the calculated performance deterioration degree is output as the performance deterioration degree of the system, for example, by a method of storing the performance deterioration degree in a memory or storing the performance deterioration degree in a file with a host which has the largest performance deterioration degree as a bottleneck place.

In Example 2, in S2104, a process in an uncompleted state at a degeneration place due to a configuration change is calculated using the load-performance correspondence information 233. The queue usage quantity 1402 corresponding to the system load calculated in S2103 and the host type to be operated acquired in S2101 is acquired. The acquired queue usage quantity 1402 is handled as the throughput of an uncompleted state at a configuration change place and output, for example, by a method of storing the queue usage quantity in a memory or storing the queue usage quantity in a file. S2104 in Example 2 may be executed under the same condition as S2104 in Example 1.

In Example 2, in S2105, the degree of performance deterioration due to a re-request of a process in an uncompleted state at a degeneration place is calculated using the load-performance correspondence information 233. This step is executed when S2104 is executed. A specific example of the process will be described. First, the amount of load obtained by adding the system load calculated in S2103 and the process of the uncompleted state acquired in S2104 is calculated, and the queue usage quantity 1402 of each host corresponding to the calculated load is acquired. The performance deterioration degree of each host is acquired from the acquired queue usage quantity of each host and the table 1500, and the largest value out of the acquired performance deterioration degree of each host is handled as the performance deterioration degree of the system when a load due to a re-access of an uncompleted process is applied. The difference between the performance deterioration degree of the system calculated in S2105 and the performance deterioration degree calculated in S2103 is calculated as the performance deterioration degree due to the re-access of the uncompleted process and output, for example, by a method of storing the performance deterioration degree in a memory or storing the performance deterioration degree in a file.

S2106 in Example 2 is executed by applying the same change as S2103 to S2105 to the process in Example 1.

As described above, according to the management computer provided in the examples, a temporary increase in load according to a configuration change is considered, whereby it is possible to increase the accuracy of evaluation of the influence of the configuration change on the system performance.

In the examples, although the system configuration information 231 indicates only the system configuration in units of devices for simplification, for example, information of the number or performance of storage controllers, DISKs, or I/O ports in a storage device may be stored. The performance estimation process provided by the examples can be applied to a configuration change of a component in a storage device, or the like.

REFERENCE SIGNS LIST

201: management server
203: server device
204: storage device
221: performance estimation processing unit
222: response time calculation processing unit
223: SPOF detection processing unit

The invention claimed is:

1. An information processing device comprising:
a network interface communicatively coupled to a plurality of computer systems and a plurality of servers via a network, wherein the plurality of computer systems includes a first computer system and the plurality of servers includes a first server;
a memory; and
a processor communicatively coupled to the network interface and the memory;
wherein the memory stores:
configuration information indicating the configuration of each of the plurality of computer systems,
expected performance information indicating the expected performance of each of the plurality of computer systems according to the configuration information, and
load-performance correspondence information indicating a performance degradation amount of each of the plurality of computer systems according to a system configuration and a load;
wherein the processor detects an occurrence of a deterioration event caused by the first server stopping and in response to the occurrence of the deterioration event, the processor:

determines an operation stop time for the first server and an evaluation target period for the first computer system based on the occurrence of the deterioration event,
acquires, from the memory, the expected performance of the first computer system according to the configuration information for the first computer,
calculates a throughput required for the first server at the operation stop time,
calculates the performance degradation amount of the first computer system according to the throughput required for the first server and the load-performance correspondence information,
calculates a response time for a process request of the first computer system based on performance estimation information, wherein the performance estimation includes the expected performance and the performance degradation amount after the occurrence of the deterioration event,
calculates an additional time required, when the response time exceeds a predetermined threshold value, and
estimates an estimated performance of the first computer system based on the performance estimation information, the response time and the additional time required, and
automatically performs a configuration change to one or more of the plurality of servers based on the estimated performance of the first computer system to obtain a target value service level objective (SLO).

2. The information processing device according to claim 1, wherein the processor further:
calculates the throughput required for the first server at the time of the operation stop as a load amount of the first computer system increasing with reception of retransmission of a request not processed by the first server in another server included in the plurality of servers, to thereby estimate the performance of the first computer system.

3. The information processing device according to claim 2, wherein the processor further:
calculates the load according to the process request to the first computer system at the time of the operation stop,
acquires the configuration of the first computer system at the time of the operation stop from the configuration information, and
calculates a process request amount to the server based on the load according to the process request and the configuration of the first computer system.

4. The information processing device according to claim 1,
wherein, in the first computer system, a time-out period of the process request and a re-request policy for retransmitting a same process request when the process request is timed out are set, and
the processor further:
determines whether or not the response time in the evaluation target period exceeds the time-out period, and
when the response time exceeds the time-out period, outputs information indicating that the response time is likely to be increased due to an influence of the re-request.

5. A performance evaluation method comprising:

detecting, by a processor of an information processing device an occurrence of a deterioration event caused by a first server from a plurality of servers stopping;

determining, by the processor of the information processing device, an operation stop time of the first server and an evaluation target period for a first computer system based on the occurrence of the deterioration event;

acquiring, from a memory of the information processing device, an expected performance of the first computer system based configuration information stored in the memory for the first computer, calculating, by the processor of the information processing device, a throughput required for the first server at the operation stop time, calculating, by the processor of the information processing device, a performance degradation amount of the first computer system after the occurrence of the deterioration event according to the throughput required for the first server and load-performance correspondence information stored in the memory, calculating, by the processor of the information processing device, a response time for a process request based on performance estimation information, wherein the performance estimation includes the expected performance and the performance degradation amount after the occurrence of the deterioration event, calculating, by the processor of the information processing device, an additional time required, when the response time exceeds a predetermined threshold value, and estimating, by the processor of the information processing device, an estimated-performance of the computer system based on the performance estimation information, the response time and the additional time required; and automatically performs a configuration change to one or more of plurality of servers to obtain a target value service level objective (SLO) based on the estimated performance of the first computer system.

* * * * *